US012375879B2

(12) United States Patent
Lund et al.

(10) Patent No.: US 12,375,879 B2
(45) Date of Patent: Jul. 29, 2025

(54) SYSTEMS AND METHODS FOR NAVIGATION MODEL ENHANCEMENT

(71) Applicant: QUALCOMM Incorporated, San Diego, CA (US)

(72) Inventors: Benjamin Lund, Escondido, CA (US); Bala Ramasamy, San Marcos, CA (US); Edwin Chongwoo Park, San Diego, CA (US); Daniel Baker, San Diego, CA (US); Dan Vassilovski, Del Mar, CA (US); Xiaoxin Zhang, Sunnyvale, CA (US); Soumya Das, San Diego, CA (US); Garrett Shriver, Santee, CA (US)

(73) Assignee: QUALCOMM Incorporated, San Diego, CA (US)

( * ) Notice: Subject to any disclaimer, the term of this patent is extended or adjusted under 35 U.S.C. 154(b) by 291 days.

(21) Appl. No.: 17/804,976

(22) Filed: Jun. 1, 2022

(65) Prior Publication Data

US 2023/0396958 A1  Dec. 7, 2023

(51) Int. Cl.
*H04W 4/029* (2018.01)
*H04W 24/08* (2009.01)

(52) U.S. Cl.
CPC .......... *H04W 4/029* (2018.02); *H04W 24/08* (2013.01)

(58) Field of Classification Search
CPC ....... H04W 4/029; H04W 24/08; H04W 4/40; H04W 4/026; H04W 4/027
See application file for complete search history.

(56) References Cited

U.S. PATENT DOCUMENTS

| 2017/0220968 | A1* | 8/2017 | Lugo | H04W 4/08 |
| 2019/0005812 | A1* | 1/2019 | Matus | G06V 20/584 |
| 2019/0057209 | A1* | 2/2019 | Dyer | H04L 9/3234 |
| 2021/0286040 | A1* | 9/2021 | Morishita | G01S 13/86 |
| 2022/0167347 | A1 | 5/2022 | Fehrenbach et al. | |

(Continued)

FOREIGN PATENT DOCUMENTS

| CN | 112789668 A * | 5/2021 | G08B 25/016 |
| EP | 2222063 A1 | 8/2010 | |
| WO | 2021150087 A1 | 7/2021 | |

OTHER PUBLICATIONS

International Search Report and Written Opinion—PCT/US2023/022891—ISA/EPO—Aug. 18, 2023.

*Primary Examiner* — Said M Elnoubi
(74) *Attorney, Agent, or Firm* — Procopio, Cory, Hargreaves & Savitch LLP

(57) ABSTRACT

Aspects presented herein may improve the performance of mobile/computer applications. Aspects presented herein may enable mobile/computer applications to differentiate entities that are associated with UEs or entities running the navigations applications, thereby enabling the mobile/computer applications (or their associated servers) to have a more accurate understanding of the conditions surrounding the UEs and their users. In one aspect, a network node obtains first information including at least one feature associated with a plurality of devices. The network node selects a first subset of the plurality of devices for a measurement based on the at least one feature associated with the plurality of devices (or the network node may exclude a second subset of the plurality of devices from the measurement).

30 Claims, 14 Drawing Sheets

(56) References Cited

U.S. PATENT DOCUMENTS

| | | |
|---|---|---|
| 2022/0262253 A1 | 8/2022 | Wu et al. |
| 2023/0353993 A1 | 11/2023 | Hwang et al. |
| 2025/0014463 A1 | 1/2025 | Vassilovski |

* cited by examiner

SYSTEMS AND METHODS FOR NAVIGATION MODEL ENHANCEMENT

TECHNICAL FIELD

The present disclosure relates generally to positioning systems, and more particularly, to positioning systems involving navigation.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus obtains first information including at least one feature associated with a plurality of devices. The apparatus selects a first subset of the plurality of devices for a measurement based on the at least one feature associated with the plurality of devices.

To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of various aspects may be employed.

DETAILED DESCRIPTION

Figure 1:
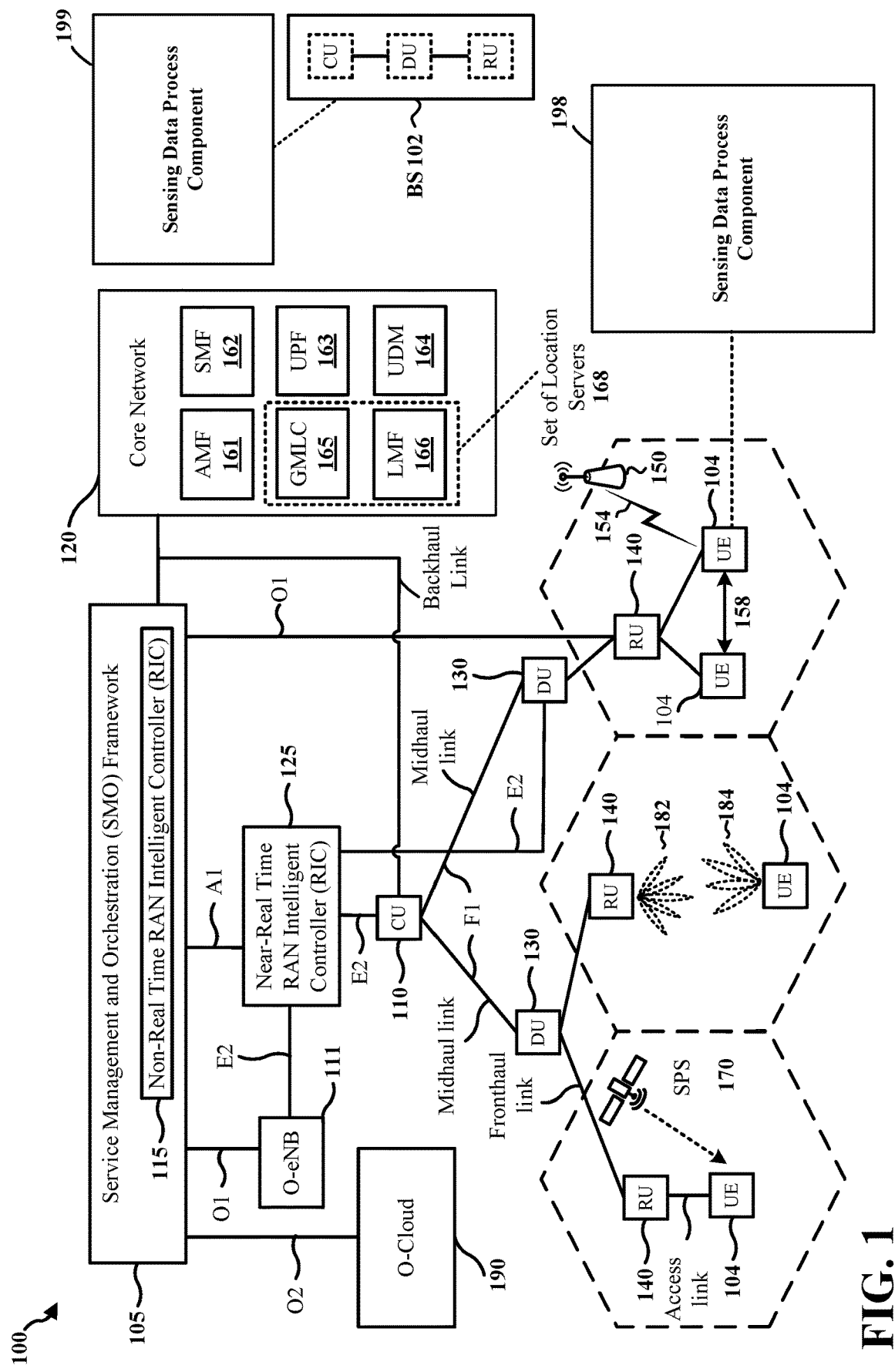
FIG. 1 is a diagram illustrating an example of a wireless communications system and an access network.

Aspects presented herein may improve the performance of mobile applications, such as navigation applications, advertising applications, and/or messaging applications. Aspects presented herein may enable mobile applications to differentiate entities that are associated with UEs/entities running the mobile applications, thereby enabling the mobile applications (or their associated servers) to have a more accurate understanding of the conditions surrounding the UEs and to provide a better user experience for the users.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor (s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit—User Plane (CU-UP)), control plane functionality (i.e., Central Unit—Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base stations 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a transmit reception point (TRP), network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the serving base station 102. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may be configured to obtain first information including at least one feature associated with a plurality of devices, and select a first subset of the plurality of devices for a measurement based on the at least one feature associated with the plurality of devices via the sensing data process component 198. In certain aspects, the base station 102 may be configured to obtain first information including at least one feature associated with a plurality of devices, and select a first subset of the plurality of devices for a measurement based on the at least one feature associated with the plurality of devices via the sensing data process component 199.

Figure 2:
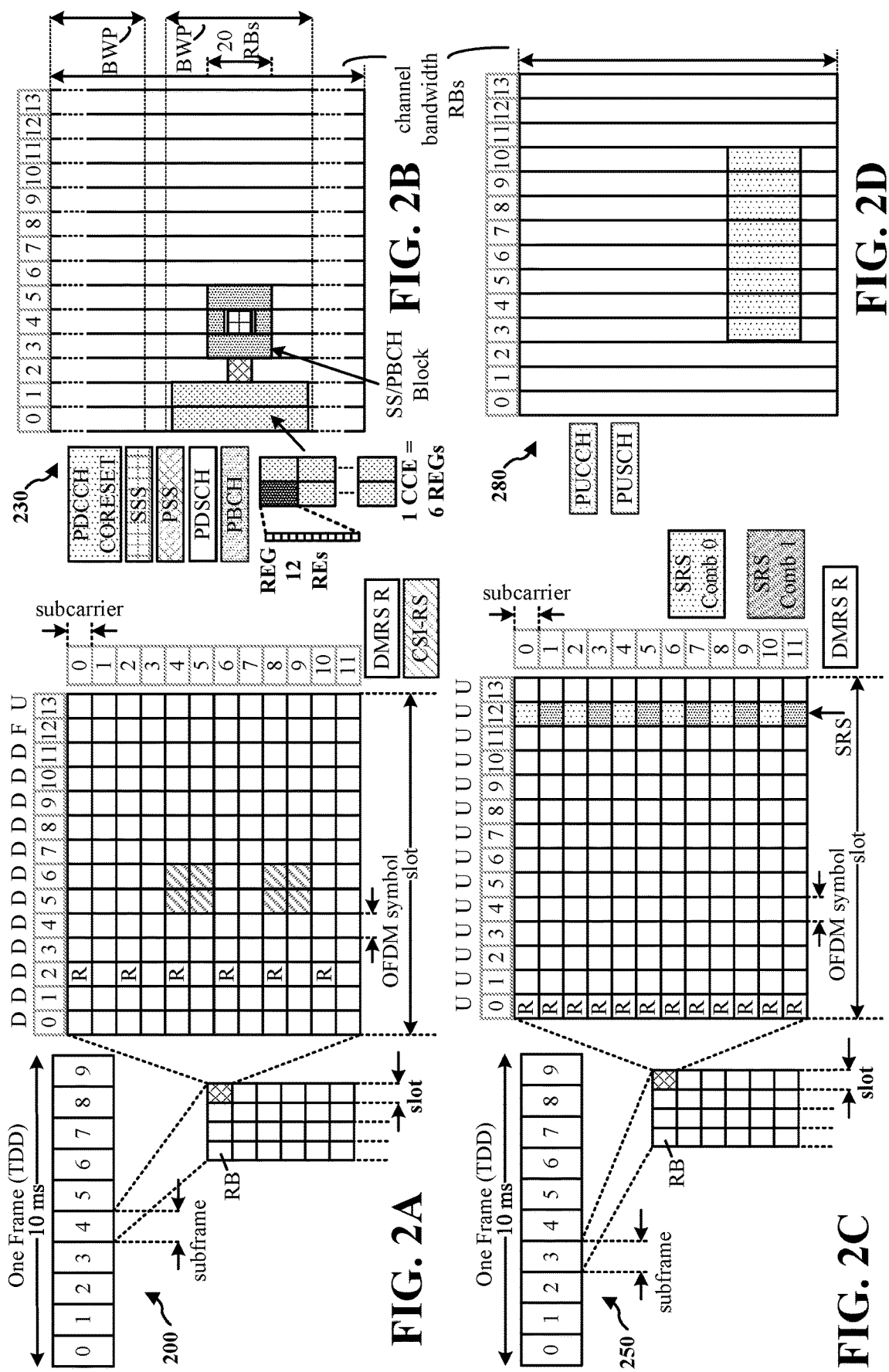
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| μ | SCS<br>$\Delta f = 2^\mu \cdot 15$[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology it, there are 14 symbols/slot and $2^\mu$ slots/subframe. The subcarrier spacing may be equal to $2^\mu * 15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology 1.1=2 with 4 slots per subframe. The slot duration is 0.25 ms, the subcarrier spacing is kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIB s), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
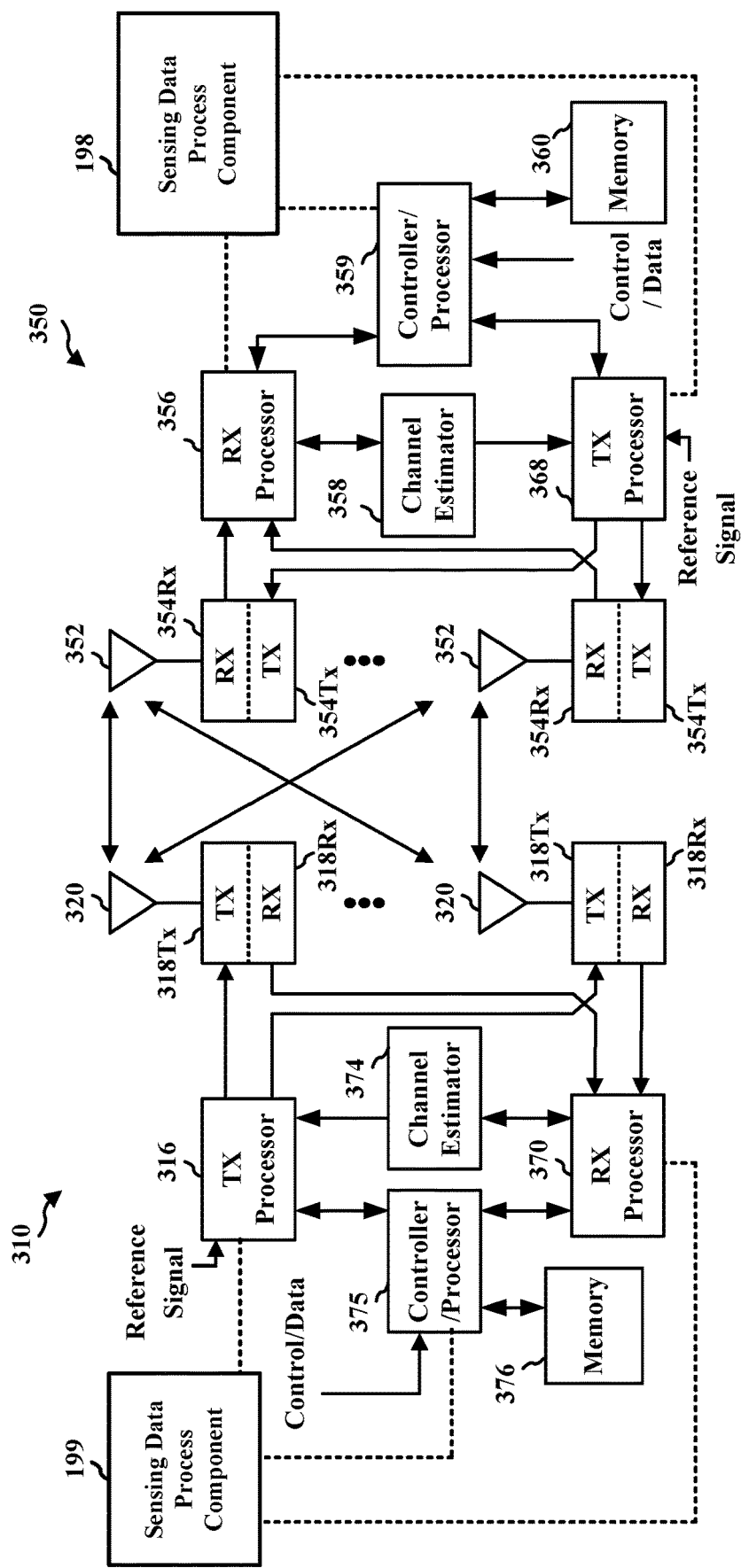
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIB s), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIB s) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the sensing data process component 198 of FIG. 1.

At least one of the TX processor 316, the RX processor 370, and the controller/processor 375 may be configured to perform aspects in connection with the sensing data process component 199 of FIG. 1.

Figure 4:
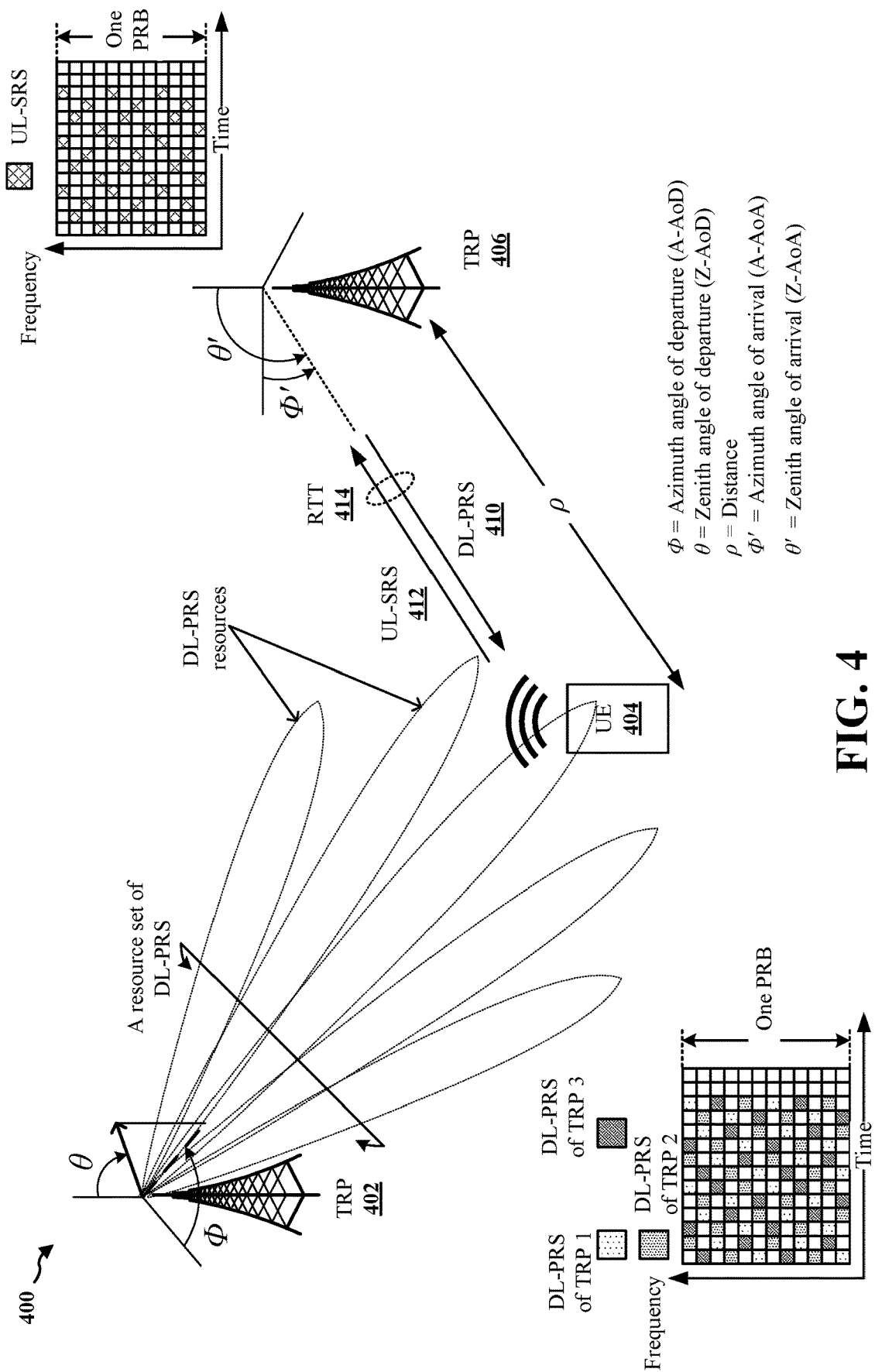
FIG. 4 is a diagram illustrating an example of a UE positioning based on reference signal measurements in accordance with various aspects of the present disclosure.

FIG. 4 is a diagram 400 illustrating an example of a UE positioning based on reference signal measurements (which may also be referred to as "network based positioning") in accordance with various aspects of the present disclosure. The UE 404 may transmit UL-SRS 412 at time $T_{SRS\_TX}$ and receive DL positioning reference signals (PRS) (DL-PRS) 410 at time $T_{PRS\_RX}$. The TRP 406 may receive the UL-SRS 412 at time $T_{SRS\_RX}$ and transmit the DL-PRS 410 at time $T_{PRS\_}TX$. The UE 404 may receive the DL-PRS 410 before transmitting the UL-SRS 412, or may transmit the UL-SRS 412 before receiving the DL-PRS 410. In both cases, a positioning server (e.g., location server(s)168) or the UE 404 may determine the RTT 414 based on an absolute value of ($|T_{SRS\_RX}-T_{PRS\_TX}|-|T_{SRS\_TX}-T_{PRS\_RX}|$). Accordingly, multi-RTT positioning may make use of the UE Rx-Tx time difference measurements (i.e., $|T_{SRS\_TX}-T_{PRS\_RX}|$) and DL-PRS reference signal received power (RSRP) (DL-PRS-RSRP) of downlink signals received from multiple TRPs 402, 406 and measured by the UE 404, and the measured TRP Rx-Tx time difference measurements (i.e., $|T_{SRS\_RX}-T_{PRS\_TX}|$) and UL-SRS-RSRP at multiple TRPs 402, 406 of uplink signals transmitted from UE 404. The UE 404 measures the UE Rx-Tx time difference measurements (and/or the DL-PRS-RSRP of the received signals) using assistance data received from the positioning server, and the TRPs 402, 406 measure the gNB Rx-Tx time difference measurements (and/or the UL-SRS-RSRP of the received signals) using assistance data received from the positioning server. The measurements may be used at the positioning server or the UE 404 to determine the RTT, which is used to estimate the location of the UE 404. Other methods are possible for determining the RTT, such as for example using DL-TDOA and/or UL-TDOA measurements.

DL-AoD positioning may make use of the measured DL-PRS-RSRP of downlink signals received from multiple TRPs 402, 406 at the UE 404. The UE 404 measures the DL-PRS-RSRP of the received signals using assistance data received from the positioning server, and the resulting measurements are used along with the azimuth angle of departure (A-AoD), the zenith angle of departure (Z-AoD), and other configuration information to locate the UE 404 in relation to the neighboring TRPs 402, 406.

DL-TDOA positioning may make use of the DL reference signal time difference (RSTD) (and/or the DL-PRS-RSRP) of downlink signals received from multiple TRPs 402, 406 at the UE 404. The UE 404 measures the DL RSTD (and/or the DL-PRS-RSRP) of the received signals using assistance data received from the positioning server, and the resulting measurements are used along with other configuration information to locate the UE 404 in relation to the neighboring TRPs 402, 406.

UL-TDOA positioning may make use of the UL relative time of arrival (RTOA) (and/or the UL-SRS-RSRP) at multiple TRPs 402, 406 of uplink signals transmitted from UE 404. The TRPs 402, 406 measure the UL-RTOA (and/or the UL-SRS-RSRP) of the received signals using assistance data received from the positioning server, and the resulting measurements are used along with other configuration information to estimate the location of the UE 404.

UL-AoA positioning may make use of the measured azimuth angle of arrival (A-AoA) and zenith angle of arrival (Z-AoA) at multiple TRPs 402, 406 of uplink signals transmitted from the UE 404. The TRPs 402, 406 measure the A-AoA and the Z-AoA of the received signals using assistance data received from the positioning server, and the resulting measurements are used along with other configuration information to estimate the location of the UE 404.

Additional positioning methods may be used for estimating the location of the UE 404, such as for example, UE-side UL-AoD and/or DL-AoA. Note that data/measurements from various technologies may be combined in various ways to increase accuracy, to determine and/or to enhance certainty, to supplement/complement measurements, and/or to substitute/provide for missing information.

A navigation application may refer to an application in a user equipment (UE) (e.g., a smartphone) that provides navigational directions in real time. Over the last few years, users have increasingly relied on navigation applications because they have provided various benefits. For example, navigation applications provide convenience to users as they enable the users to find a way to their destinations, and also allow users to contribute information and mark places of importance thereby generating the most accurate description of a location. In some examples, navigation applications are also capable of providing expert guidance for users, where a navigation application may guide a user to a destination via the best, most direct, or most time-saving routes. For example, a navigation application may obtain the current status of traffic, and then locate a shortest and fastest way for a user to reach a destination, and also provide approximately how long it will take the user to reach the destination. As such, a navigation application may use an Internet connection and a GPS/GNSS navigation system to provide turn-by-turn guided instructions on how to arrive at a given destination.

In some scenarios, information provided by navigation applications may be based on historical data and/or real-time data from devices (e.g., UEs) that have opted in to share the real-time data. For example, users using a navigation application may be specified to provide their locations, directions, and/or traveling speeds. Then, based at least in part on the real-time data provided by these users, the navigation application (or the server associated with the navigation application) may be able to determine the traffic around the users. However, at times, navigation applications may not be able to provide accurate information or prediction as they may not have the capability to differentiate or recognize the circumstances in which the users are using the navigation application. For example, a navigation application may not be able to determine whether a user is using the navigation application in a vehicle, on the street, or on other types of transportations, etc. This may cause the navigation application to provide inaccurate traffic data.

Figure 5:
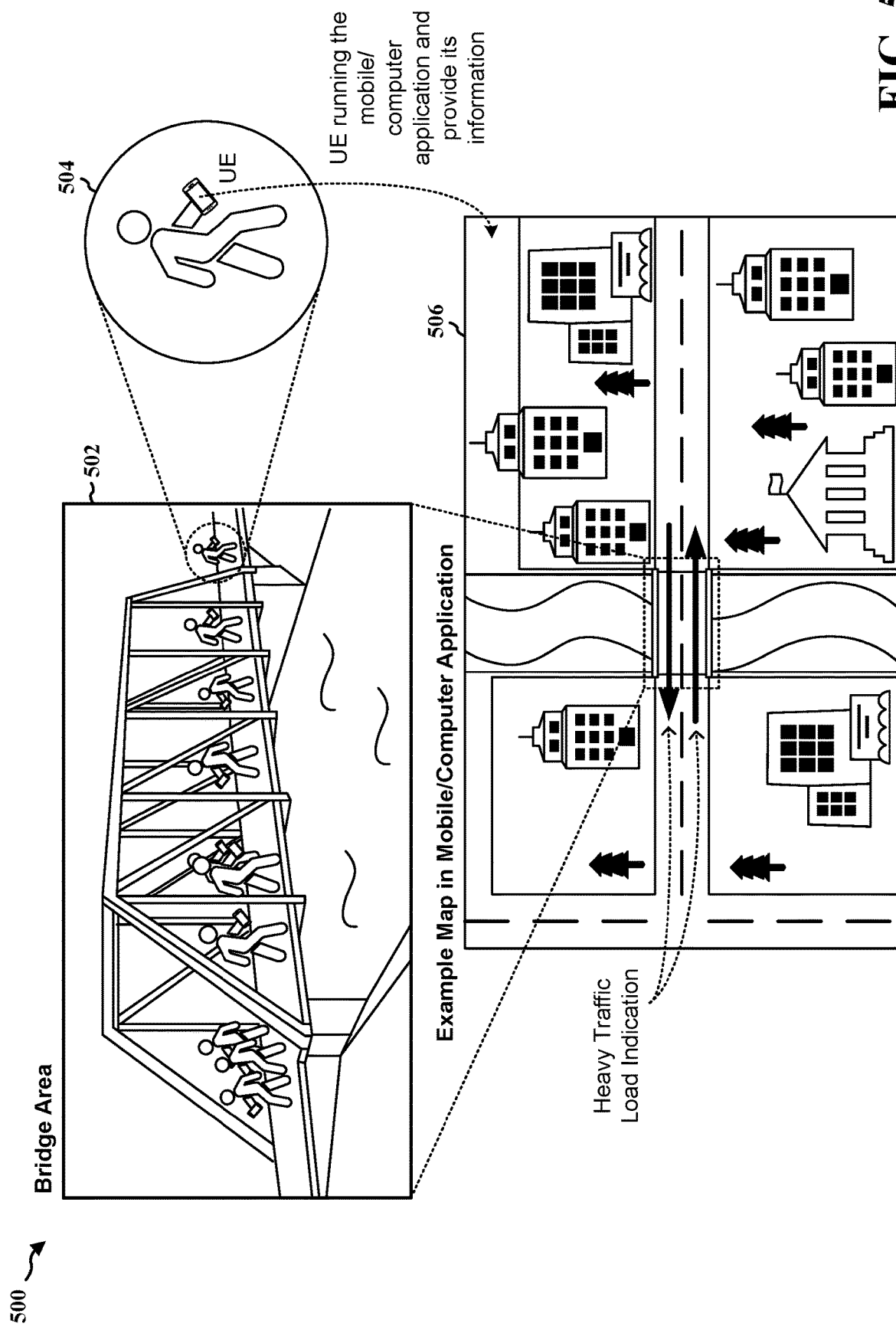
FIG. 5 is a diagram illustrating an example of a navigation application that predicts traffics based on real-time data from users in accordance with various aspects of the present disclosure.

FIG. 5 is a diagram 500 illustrating an example of a navigation application that predicts traffics based on real-time data from users in accordance with various aspects of the present disclosure. As shown at 502 and 504, a group of pedestrians may be walking on a bridge area, and the group of pedestrians may be using a navigation application via their UEs (e.g., mobile phones, smart watches, etc.). If the group of pedestrians have opted in to share their real time data, such as their locations, speeds, and/or orientations, the navigation application (or the server associated with the navigation application) may collect these real time data and predict the traffic around the bridge area. However, as shown at 506, if the navigation application (or the algorithm run by the navigation application) is unable to differentiate whether the UEs (or the real time data) represent vehicles, cyclists, or pedestrians, the navigation application/server may predict that there is a heavy vehicle traffic load on the bridge area when there is a certain number of UEs on the bridge area that are moving below a speed threshold. Thus, the navigation application may provide an inaccurate prediction on the traffic, and thereby effecting the accuracy of route planning by the navigation application (e.g., finding the fastest and shortest routes). In some examples, in addition to not being able to differentiate/recognize entities (e.g., vehicles, pedestrians, etc.) associated with the UEs running the navigation application, the algorithm run by the navigation application may also be limited to make traffic prediction when there is more than certain amount of UEs providing data. For example, the algorithm may specify X UEs (e.g., X=30, 50, etc.) to be considered as sufficient data for making traffic predictions. As such, the algorithm may avoid making the traffic prediction in an area if there are insufficient UEs providing their real time data, or if the UEs have not opted in to share their real time data.

Aspects presented herein may improve the performance of mobile/computer applications. Aspects presented herein may enable mobile/computer applications to differentiate entities that are associated with UEs/entities running the mobile/computer applications, thereby enabling the mobile/computer applications (or their associated servers) to have a more accurate understanding of the conditions surrounding the UEs and their users. Note while diagrams may use a navigation application as an example to illustrate the present disclosure, aspects of the present disclosure may also be applied to other types of mobile/computer applications, such as advertising applications and messaging applications.

In one aspect of the present disclosure, a mobile/computer application (or a server associated with the mobile/computer application) may use one or more infrastructures to identify approximate locations of UEs in an area and/or the number of UEs in the area. For purposes of the present disclosure, the approximate location of the UE may include the absolute location of the UE and the relative position of the UE. For example, to determine an approximate location of the UE may include determining a relative range, measuring a relative range between UEs or estimating a relative range between UEs, etc. The mobile/computer application may include a navigation application, an advertisement application or an application including advertisement, a messaging application, etc. The server may include location server, crowd-sourcing server, or venue statistics server, etc. For example, a base station (or a component of the base station) or a road side unit (RSU) may identify a number of UEs in an area based on UEs connected to the base station or the RSU from that area or via certain beam direction(s) associated with the area. In some examples, the base station or the RSU may further determine the speed of the UEs detected based on their Doppler information, and the base station or the RSU may classify whether a particular is likely to be a pedestrian UE or a vehicle UE. For purposes of the present disclosure, a UE being held by, or co-located with, a pedestrian (e.g., a user walking on the road) may be referred to as a "pedestrian UE," and a UE being used in a vehicle by a user or is part of a vehicle (e.g., part of the vehicle's onboard communication system) may be referred to as a "vehicle UE." Based at least in part on the number of UEs in an area and their identifications (e.g., pedestrian UE, vehicle UE, other types of UEs, etc.), a mobile/computer application may have a better understanding regarding the UEs and conditions of the area, and the mobile/computer application may use this information to make a more accurate prediction, advertisement, messaging, and/or navigation for its users.

Figure 6:
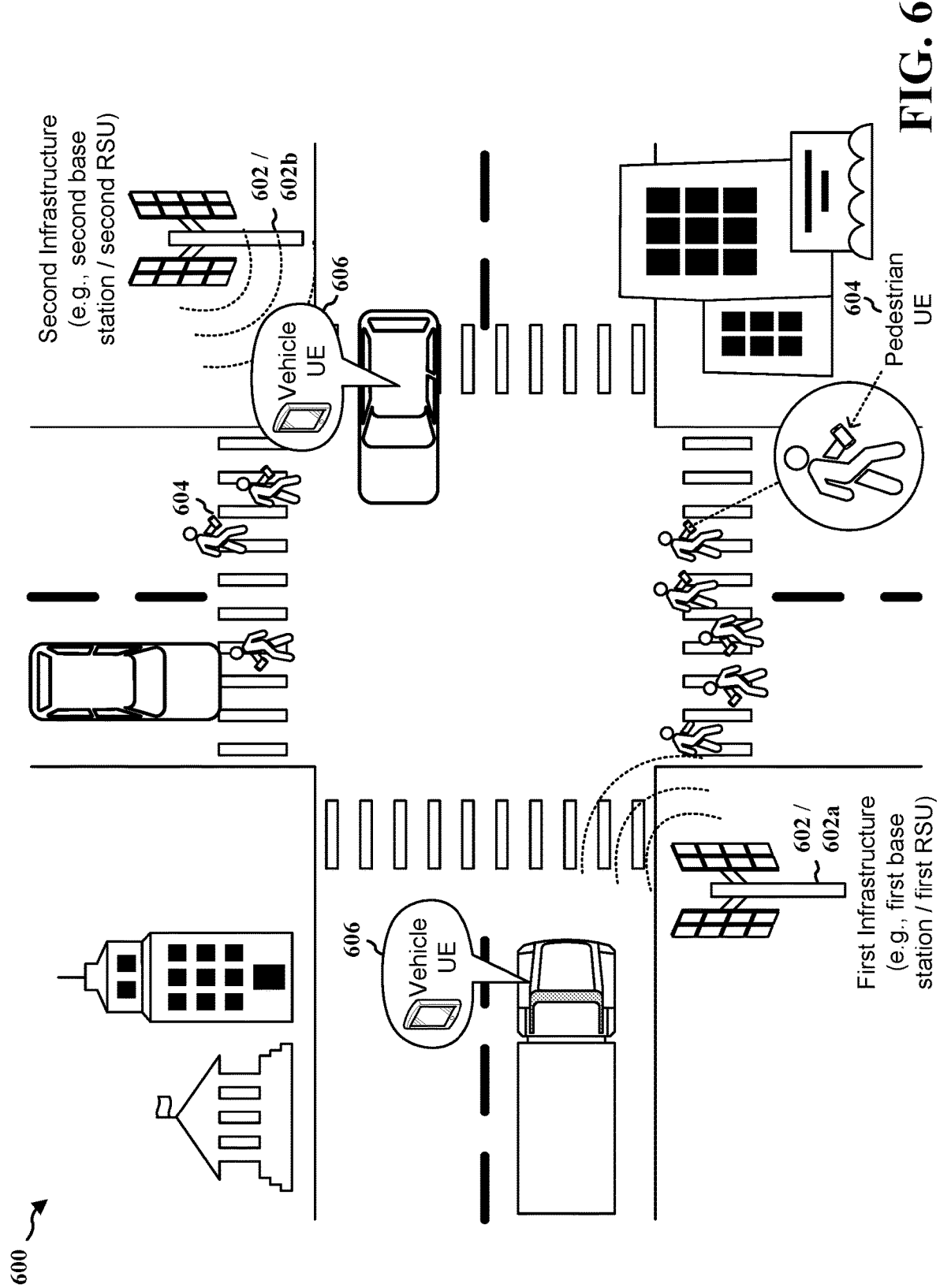
FIG. 6 is a diagram illustrating an example of using an infrastructure to identify locations and the number of UEs in an area in accordance with various aspect of the present disclosure.

FIG. 6 is a diagram 600 illustrating an example of using an infrastructure to identify locations and the number of UEs in an area in accordance with various aspect of the present disclosure. Infrastructures 602a and 602b (collectively as infrastructures 602), which may each be a base station, a component of the base station, or an RSU, may detect the number of UEs accessing or communicating with the infrastructures 602 in certain directions, e.g., based on the direction of communication beams between the infrastructures 602 and the UEs. For example, the infrastructures 602 may detect that there are X UEs in an intersection area. Then, the infrastructures 602 may further measure or obtain the Doppler information of the X UEs to determine their speed. Based on the speed detected or the average speed detected over a period of time, the infrastructures 602 may identify or predict whether a UE is a pedestrian UE, a vehicle UE, or another type of UEs. For example, the infrastructures 602 may classify UEs that are moving between three (3) to four (4) miles per hour as pedestrian UEs 604, UEs that are moving above fifteen miles are vehicle UEs 606, and UEs that are not moving for a period of time are stationary devices, etc. In some examples, the Doppler information of the UEs may further be used to identify the orientations of the UEs, such as the measured Doppler is shifting towards the infrastructures 602 or moving away from the infrastructures 602. As such, the infrastructures 602 may also identify or predict the travelling directions of the UEs.

In one example, based on knowing the number of UEs in an area, their directions, and/or their potential classifications, a navigation application may use this information to have a better understanding regarding the traffic in this area. For example, if the infrastructures 602 identify that there are ten pedestrian UEs 604 and two vehicle UEs 606 in the intersection, the navigation application may determine that the vehicle traffic for the intersection is light, whereas if the infrastructures 602 identify that there are twelve vehicle UEs 606 moving at one direction in the intersection, the navigation application may determine that the vehicle traffic for the intersection at that one direction is heavy, etc. Thus, the navigation application may make a more accurate prediction and navigation for this intersection area without specifying users in this area are sharing their real-time information.

In another example, based on knowing the classifications and/or movements of UEs, an advertisement application (or an application including advertisements) and/or an advertiser may be able to provide more targeted or suitable advertisements at different areas. For example, based on the number of vehicle UEs and pedestrian UEs detected over a period of time, advertisement using larger billboards (e.g., that are dynamic) may focus on areas with more vehicle UEs (e.g., targeting passengers in vehicles) whereas advertisement using smaller signs/monitors may focus more on areas with more pedestrian UEs (e.g., targeting pedestrians) as people walking may be more inclined to stop what they are doing and enjoy food, entertainment, shopping, etc. In another example, passengers/bicyclists stopped at an intersection may be shown a dynamic advertisement instead of a static advertisement. In some examples, advertisers may be charged by an amount of consumers seeing the advertisement and/or based on the type of people viewing the advertisement, e.g., exercisers, parents pushing strollers, people wearing suits, etc.

In another example, based on knowing the classifications and/or movements of UEs, a messaging application may be configured to display messages and communications different. For example, tailored messages (similar to targeted advertisement) may be provided to users based on the motion of users (or their UEs). For example, a scrolling message may be more suitable for people who are stationary, but less suitable for people who are moving above certain speeds. In another example, vehicle related messages, such as a speeding warning or a "don't drink and drive" warning may be displayed for vehicle UEs but excluded from pedestrian UEs. In another example, if both vehicle UEs and pedestrian UEs are detected, a warning message may be provide to the vehicle UEs regarding the presence of the pedestrians (e.g., watch out for pedestrians) and/or a similar warning message may be provided to the pedestrian UEs regarding the presence of the vehicles (e.g., watch out for vehicles), etc.

In some examples, the infrastructures 602 may be configured to periodically and/or randomly sample UEs in one or more areas and perform positioning for these UEs. The infrastructures 602 may also use other available positioning means to detect the locations of the UEs. For example, the infrastructures 602 may use radio frequency (RF) sensing and/or network positioning methods to identify the locations of the UEs. At least one benefit of using an infrastructure to identify the number of UEs, their locations, and/or their classifications is that these information may be collected by an entity without specifying UEs to opt-in sharing their information, thereby enabling the entity to obtain a more accurate and complete information compared to information obtained based on opt-in. In other words, the infrastructure may collect this information passively. Note while FIG. 6 illustrates an example of using the infrastructure to identify the number of UEs in an area, it is merely for illustrative purposes. The same mechanism may also be used to identify the number of UEs in certain areas, such as within a shopping mall, a parking garage, or a building. Then, an application may use this information to derive other information associated with these areas, such as the approximate number of users in these areas, their congestion levels, and/or their movements/directions, etc.

In some scenarios, while aspects described in connection with FIG. 6 may enable an infrastructure or a mobile/computer application to identify the approximate number of UEs in an area, their locations, and/or their type, the infrastructure or the mobile/computer application may not be able to determine whether a group of UEs are associated or co-located with each other (e.g., multiple UEs are used by users in the same vehicle). In some examples, the infrastructure or the mobile/computer application may also not be able to accurately determine the mobility type of the UEs (e.g., pedestrian UE, vehicle UE, or other types of UE, etc.), such as when a number of vehicle UEs are moving at a low speed or are stationary (e.g., the vehicles are in a traffic jam or are parked).

In another aspect of the present disclosure, a device, a mobile/computer application/server, or an infrastructure may be configured to identify whether a cluster of UEs is associated with each other or is collocated with each other based on at least one feature associated with the cluster of UEs. In one example, by knowing whether a cluster of UEs are associated with each other in an area, a navigation application may further make a more accurate prediction on the traffics of the area. For example, the navigation application may treat a cluster of UEs as one UE instead of multiple UEs (e.g., some UEs may be excluded by the navigation application from the measurement), thereby improving the accuracy of the traffic prediction and navigation.

Figure 7:
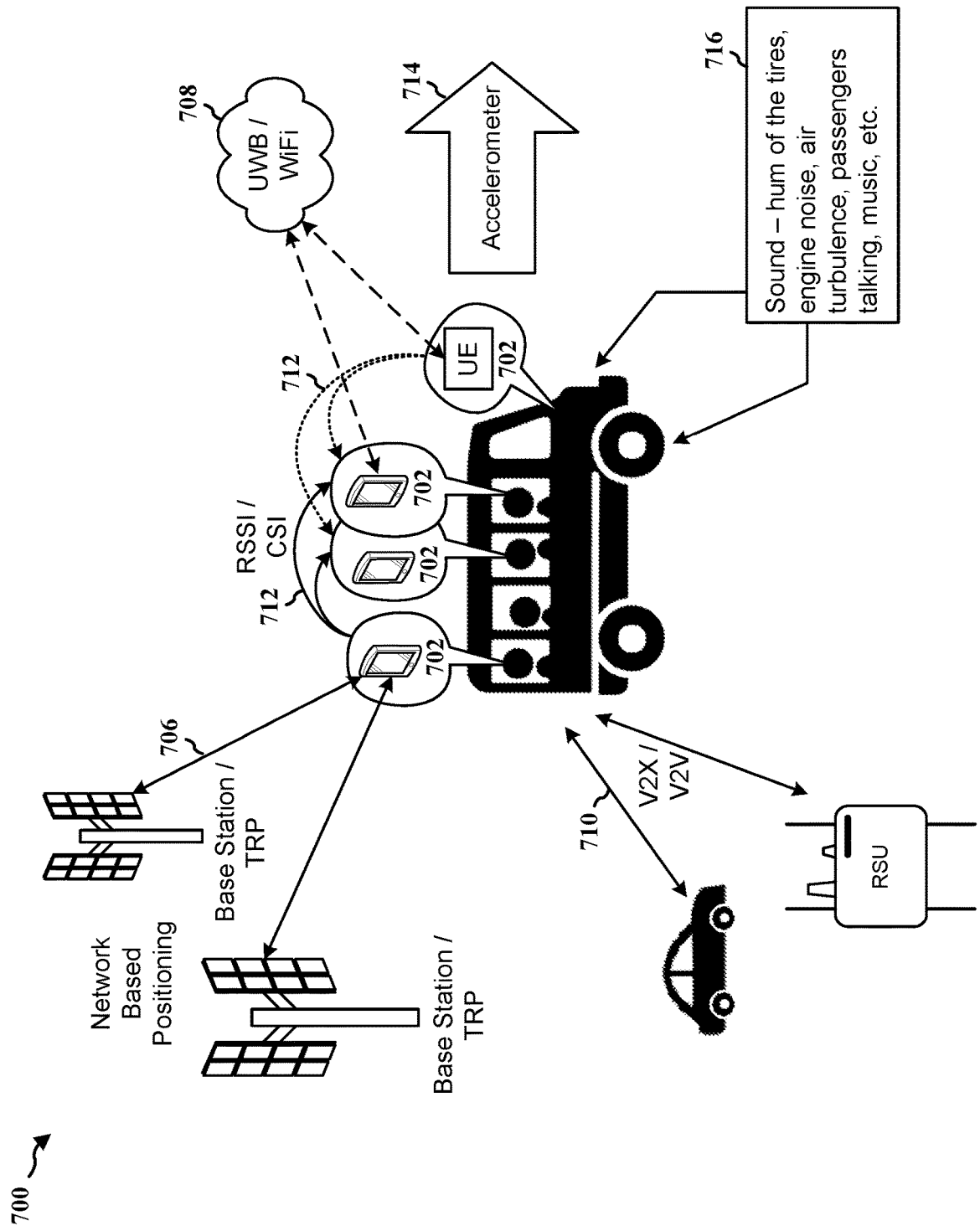
FIG. 7 is a diagram illustrating examples of identifying clusters of UEs in accordance with various aspects of the present disclosure.

FIG. 7 is a diagram 700 illustrating examples of identifying clusters of UEs in accordance with various aspects of the present disclosure. While examples illustrated by the diagram 700 shows a group of passengers/UEs in a vehicle, aspects presented herein may also apply to users/UEs in other types of spacing or area. For example, aspects presented herein may also apply to various types of UEs, such as wireless devices used in association with cycling, autonomous vehicles, autonomous delivery device/transportations, drones, etc.

In one aspect, a mobile/computer application, a server (e.g., a location server, a crowd-sourcing server, a network server, etc.), a UE, or a network device/node may be able to identify whether a cluster of UEs is associated or co-located with each other based on the UEs' locations. For example, as shown at 706, as described in connection with FIG. 4, one or more network based positioning methods may be used for identifying the location of a UE. Thus, if a location server detects that UEs 702 are at the same location or within a distance threshold of each other, the location server may determine that the UEs 702 are associated with each other.

The determination may further be based on one or more additional factors, such as the speed and/or the orientation of the UEs 702. In addition, as shown at 706, 708 and 710, control plane Uu positioning along with thresholding total received/radiate power (e.g., group/associated UEs 702 based on total received power), indoor positioning methods such as ultra-wideband (UWB) or WiFi based positioning method, and/or vehicle-to-vehicle (V2V) and/or vehicle-to-everything (V2X) based positioning methods may also be used for identifying the locations of the UEs 702 depending on the locations of the UEs 702 (e.g., in a vehicle, in a building, in a terrain, etc.).

In another aspect, a mobile/computer application, a server, a UE, or a network device/node may be able to identify whether a cluster of UEs is associated or co-located with each other based on measurements of nearby devices by the cluster of UEs. For example, as shown at 712, a group of UEs may be configured to measure reference signals or other types of signals transmitted by other devices and/or UEs (e.g., UEs/devices within their reception range), and the UEs may report their measurements to a location server or a base station, such as via a channel state information (CSI) report and/or a received signal strength indicator (RSSI) report. Based on the CSI reports and/or RSSI reports received from multiple UEs, the location server of the base station may be able to identify which clusters of UEs are associated with each other. For example, as UEs 702 are located in the same vehicle, they may receive signals from other devices (or from each other) with similar signal strengths and signatures. Thus, the location server or the base station may use such measurements and/or signatures for identifying whether the UEs 702 are co-located with each other.

In another aspect, a mobile/computer application, a server, a UE, or a network device/node may be able to identify whether a cluster of UEs is associated or co-located with each other based on their acceleration patterns and/or speeds. For example, as shown at 714, a group of UEs may be configured to report their accelerations and/or speeds over a period of time obtained via their accelerometers to a location server or a base station. As UEs in the same vehicle are likely to have similar acceleration and/or speed patterns within the same period of time, the location server of the base station may identify whether the UEs 702 are co-located with each other based on their acceleration and/or speed measurements/patterns.

In another aspect, a mobile/computer application, a server, a UE, or a network device/node may be able to identify whether a cluster of UEs is associated or co-located with each other based on sounds detected by the cluster of UEs. For example, as shown at 716, a group of UEs may be configured to report sounds (or specific types of sounds) they detected or record within a period of time to a location server or a base station. As UEs in the same vicinity (e.g., a building, in a vehicle, etc.) would likely to record/receive similar sounds over the same period of time, the location server of the base station may identify whether the UEs 702 are co-located with each other based on the sounds recorded by the UEs. The sounds may include hum of the tires, engine noise, air turbulence, passengers talking, music, or a combination thereof.

In another aspect, a mobile/computer application, a server, a UE, or a network device/node may be able to identify whether a cluster of UEs is associated or co-located with each other based on the Doppler of a signal received by nearby devices. For example, a group of UEs may be configured to measure the Doppler of signals they received (e.g., such as a beacon in a vehicle). As UEs in the same vehicle or other types of transportations would likely to obtain similar Doppler measurements from nearby devices, the location server of the base station may identify whether the UEs 702 are co-located with each other based on the Doppler information provided by the UEs 702.

After identifying that a cluster of UEs are associated or co-located with each other, a mobile/computer application, a server, a UE, or a network device/node may treat the cluster of UEs as one UE. As such, some UEs from the cluster of UEs may be excluded from measurements. For example, a navigation application may identify that the UEs 702 are within the same vehicle on a road, and the navigation application may treat the UEs 702 as one UE (or refraining from including some of the UEs 702 for measurements), such as for purposes of predicting the traffic on the road to improve the accuracy of the traffic prediction (e.g., the UEs 702 are treated as one vehicle UE instead of four separated vehicle UEs).

Figure 8:
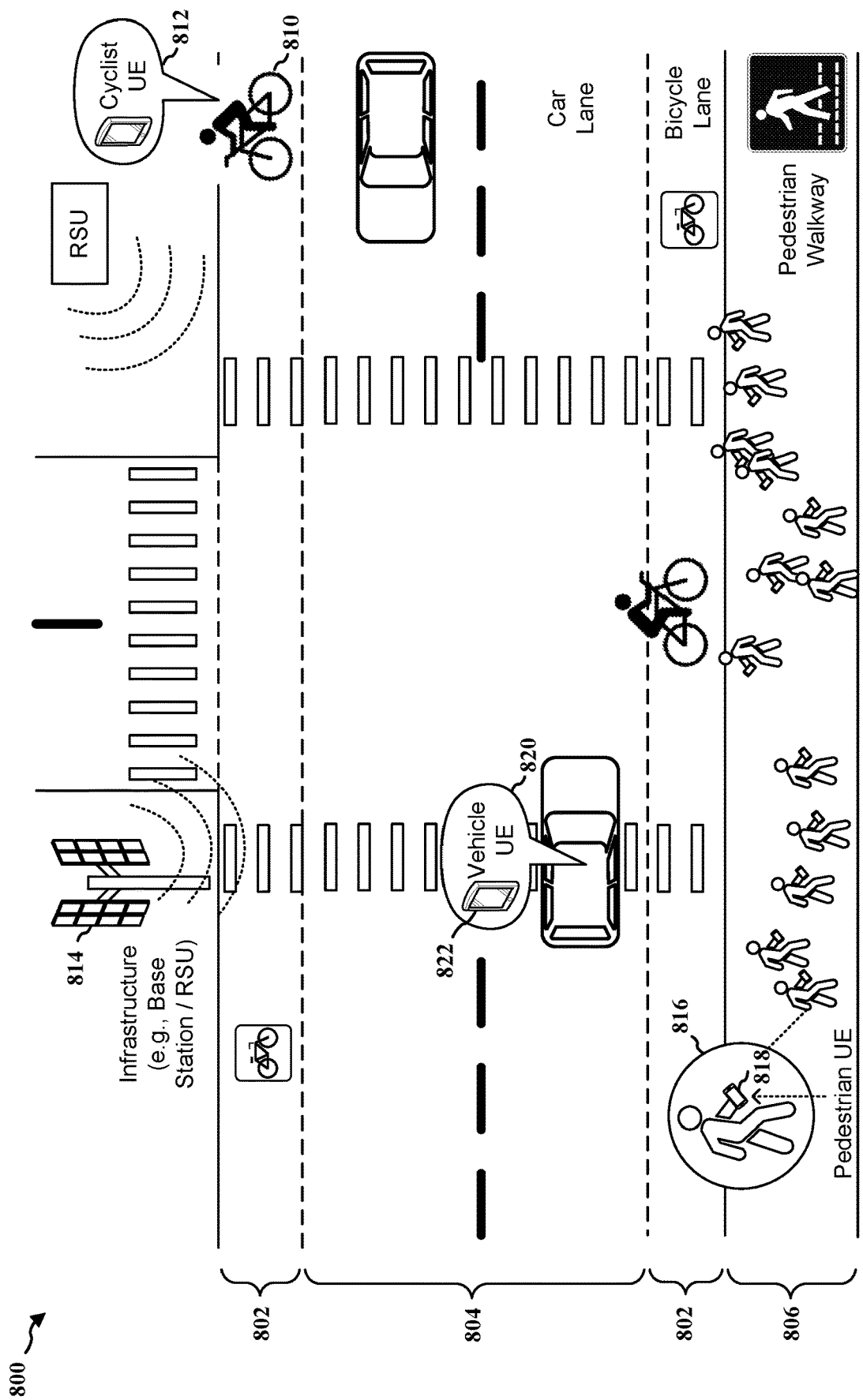
FIG. 8 is a diagram illustrating an example of identifying categories or clusters of UEs based on travel way area usage in accordance with various aspects of the present disclosure.

FIG. 8 is a diagram 800 illustrating an example of identifying categories or clusters of UEs based on travel way area usage in accordance with various aspects of the present disclosure. In another aspect of the present disclosure, a mobile/computer application, a server, a UE, or a network device/node may be able to classify types of UEs and/or identify whether a cluster of UEs is associated or co-located with each other based on travel ways. For example, an area may include bicycle lanes 802 designated for cyclist, car lanes 804 designated for cars, and pedestrian walkway 806 (which may include crosswalks) designated for pedestrians. Based on the travel way in which a UE is detected (e.g., using network based positioning methods described in connection with FIG. 4 or GNSS based positioning), the mobile/computer application, the server, the UE, or the network device/node may determine or bias toward determining that the UE is using the corresponding travel way.

For example, as shown at 810, if an infrastructure 814 detects that a UE 812 is on the bicycle lanes 802, the infrastructure 814 may determine or bias toward determining that the UE 812 is used by a cyclist (which may be referred to as a cyclist UE hereafter). As shown at 816, if the infrastructure 814 detects that a UE 818 is on the pedestrian walkway 806, the infrastructure 814 may determine or bias toward determining that the UE 818 is used by a pedestrian (e.g., a pedestrian UE). Similarly, as shown at 820, if the infrastructure 814 detects that a UE 822 is on the car lane 804, the infrastructure 814 may determine or bias toward determining that the UE 822 is used in a vehicle (e.g., a vehicle UE). Thus, the infrastructure 814 may be able to classify UEs based on their corresponding locations on designated travel ways. In addition, the infrastructure 814 may further determine whether a group of UEs are associated or co-located with each other based on their locations on travel ways. For example, if multiple UEs are detected on the car lanes 804 and they are close to each other (e.g., within 2 meters from each other), the infrastructure 814 may be biased toward determining that the UEs are located on one vehicle, whereas if UEs are detected on the pedestrian walkway 806, the infrastructure 814 may be less biased toward determining that the UEs are associated or co-located. Aspects presented herein may also be used in conjunction with aspects described in FIG. 7 to further improve the accuracy of determination.

In some scenarios, it can be helpful to distinguish between UEs using different areas of the travel way. For example, different vehicular travel ways may be categorized based on traffic control striping (e.g., through lanes, turning, parking, temporary turning lanes, parkways for emergency parking (e.g., to fix a tire), temporary loading/unloading zones, fire truck access, etc.). Motorcycles may be allowed to use unstriped areas for travel (e.g., in between lanes), and UEs on a crosswalk (during a pedestrian "walk" signal) or on a sidewalk may be less likely to be vehicle UEs, etc. These distinctions may be important for public areas that are contiguous and have different uses. For example, parks may have bike trails, streets may have shared bike/vehicular lanes, public parks may have vehicular lanes, etc. The different uses for the areas in the travel way may be identified based on local laws, traffic striping, sidewalk, etc., In some examples, UE behaviors may also be used to define how a space is being used (e.g., which may be useful for areas that don't have strict lane markings and travel way usage, etc.). For example, a UE in a parked car in a designated area for parking may have two categories: 1) as a potential pedestrian leaving the vehicle or 2) as a potential vehicle leaving the parking place. However, if the location of the UE estimated over time is accurate enough, the movement of the UE may be used to categorize the UE (e.g., to identify whether the UE is a pedestrian UE, a vehicle UE, a cyclist UE or another type of UE, etc.). For example, if a UE makes movements that a vehicle UE or a cyclist UE would not be able to make (e.g., making a sharp right turn with a short distance, going up stairs, walking between bollards/gates, etc.), the UE is likely to be a pedestrian UE. As such, UE categorization based on UE movements may further improve the accuracy of the UE categorization.

By enabling a location server, a base station, or a mobile/computer application to categorize the UE and/or determine whether a cluster of UEs are associated or co-located with each other, the location server, the base station, or the mobile/computer application may eliminate redundant UEs (e.g., UEs with similar signatures) or combine redundant UEs into one UE or exclude (e.g., refrain from including) some redundant UEs from measurements. For example, a mobile/computer application may treat the four UEs in the vehicle (e.g., UEs 702) as one UE traveling on a road instead of four different UEs travelling on the same road, which may enable the mobile/computer application to have a more accurate understanding or prediction regarding the road condition.

In another aspect of the present disclosure, information or measurements collected by UEs, base station(s), RSU(s), and/or network device(s)/node(s) as described in connection with FIGS. 6 to 8, such as the locations of UEs, their types, and/or clustering of UEs, may be transmitted to a server for analysis. The server may be a central server, a crowd-sourcing server, a cloud server, or an edge device, etc. For example, multiple entities (e.g., UEs, multiple radio access technologies (RATs), and/or RSUs, etc.) within an area may be configure to detect the locations of UEs or perform location related measurements (e.g., Doppler, speed, orientation, etc.) for the UEs in that area. Then, the multiple entities may report the location information of the UEs and/or the location related measurements to a server for the server to aggregate and eliminate redundant links. For example, a server may collect location measurements performed by a plurality of base stations (or components of base stations) for UEs in an area. Based on the collected location measurements, the server may aggregate or eliminate/exclude UEs that are likely to be associated or co-located with each other.

In some examples, the server may further instruct an entity/device to perform measurements with nearby entities/devices for verification. For example, referring to FIG. 6, after the infrastructures 602 identify the number of vehicle UEs 606 and pedestrian UEs 604 within the area, the infrastructures 602 may report the information to a server. Then, the server may request another infrastructure (not shown in the figure), a pedestrian UE, a vehicle UE, or an RSU, to perform the same measurements for that area to verify whether information collected by the infrastructures 602 is accurate. In another example, the server may enable or provide a single interface from the server to one or more cloud providers or users of traffic data, such that the cloud providers and/or the users may have easier and a more convenient means to access the traffic data.

In another aspect of the present disclosure, a hierarchy may be defined for information (e.g., sensor data) collected by different types of sensors. For example, sensors on vehicles (e.g., advanced driver assistance systems (ADAS) sensors, or vehicle sensors that have certain degree of functionality, certification, and/or anti-spoofing capability) may have a higher accuracy compared to sensors on smartphones (e.g., microphones, cameras, etc.). Thus, sensors on vehicles may be given a higher hierarchy than sensors on smartphones. As such, if a server collects sensing data from sensor(s) of a vehicle (e.g., via car-to-cloud/server/infrastructure configuration) and sensing data from sensor(s) of a smartphone, sensing data from the vehicle may take priority over the sensing data from the smartphone (if there is a conflict between the sensing data). In other words, if there are a plurality of sensors that are used (by a server) for providing the traffic data, information from sensors with higher hierarchy may take priority over information from sensors with lower hierarchy. In some examples, the sensing data provided by sensors may further be augmented with a device-specific data. For example, data provided by sensors of a vehicle to a cloud server (e.g., via car-to-cloud configuration) may be augmented with data gathered by the cloud server (e.g., a car-to-cloud platform) from sensors of other vehicles/entities.

In another aspect of the present disclosure, sensing data obtained from different sensors may also be used for verifying traffic data. For example, RF sensing technology (e.g., based on UWB, WiFi, Bluetooth, etc.) and/or image recognition technology (e.g., based on cameras) may be used to identify whether there are humans in an area or an environment (e.g., in a vehicle, in a building) and/or the number of humans in the area or the environment. Then, based on the identification, a mobile/computer application (or a location server) may make a more accurate prediction on the traffic and/or provide a more accurate navigation. For example, referring back to FIG. 7, a device (e.g., a RAT) may perform RF sensing on the vehicle to identify whether there are any humans in the vehicle and/or the number of humans in the vehicle. Thus, when the vehicle is not moving, such as when the vehicle stops at a red light, the location server (or the mobile/computer application) may determine that the vehicle is less likely to be a parked vehicle as there are human detected in the vehicle. On the other hand, if the vehicle is not moving and no human is being detected in the vehicle, the location server (or the mobile/computer application) may consider the vehicle to be a parked vehicle.

In another aspect of the present disclosure, different devices/entities may share their sensor data associated with an area and uniquely identify objects within the area. Then, the devices/entities may communicate with each other or to other devices regarding the objects being identified and/or the uniqueness associated with the objects.

Figure 9:
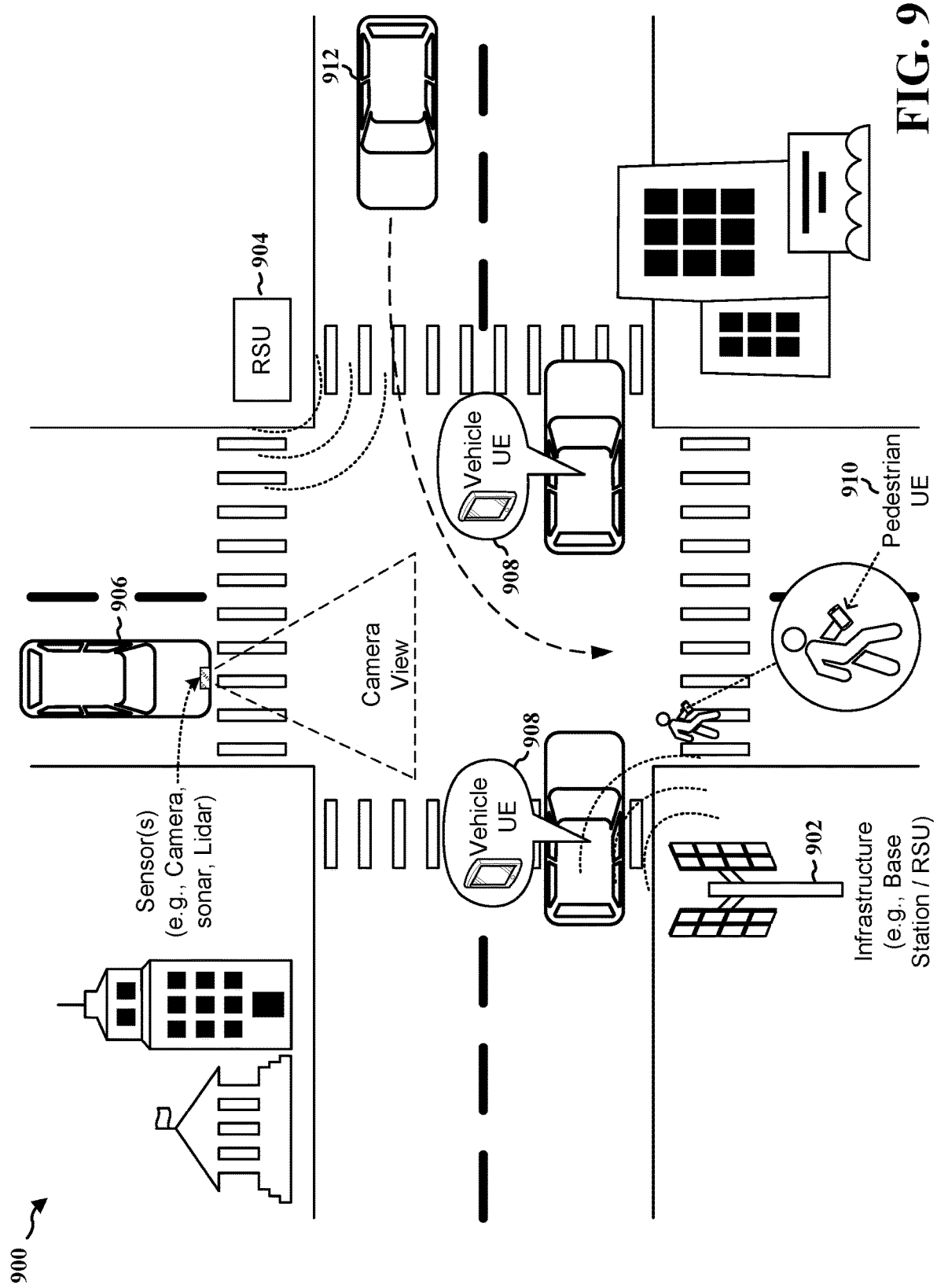
FIG. 9 is a diagram illustrating an example of a plurality of wireless devices exchanging sensor data in accordance with various aspects of the present disclosure.

FIG. 9 is a diagram 900 illustrating an example of a plurality of wireless devices exchanging sensor data in accordance with various aspects of the present disclosure. An infrastructure 902 (e.g., a base station or a component of the base station), an RSU 904, and a vehicle 906 may be configured to detect the number of UEs in an area (e.g., an intersection), the position/orientation of each UE, and/or their categorizations/classifications (e.g., vehicle UE, pedestrian UE, stationary UE, etc.) (collectively as "sensing data"). For example, the infrastructure 902 may detect that there are three UEs in the area based on their approximate location and the number of attached UEs from the area, such as described in connection with FIG. 6. The RSU 904 may identify that there are two vehicle UEs 908 moving at the same direction based on sidelink ranging/positioning. The vehicle 906 may detect that there are two vehicles and a pedestrian moving across the area, such as based on ADAS sensors (e.g., camera, sonar, Lidar, etc.) on the vehicle 906. For example, ADAS sensors may accurately identify object localization and orientation over time which may confirm vehicles driving on a road (versus parked) or pedestrian with mobile walking on a road (versus mistaking it for a vehicle), etc. Also, camera data may be useful in differentiating between devices collocated in a single vehicle, pedestrians walking together, etc. Then, the infrastructure 902, the RSU 904 and the vehicle 906 may exchange their sensing data to each other or provide their sensing data to a server. Based on the sensing data exchanged/collected, the infrastructure 902, the RSU 904, the vehicle 906, and/or the server may determine that there are likely two vehicle UEs 908 and a pedestrian UE 910 in the area. In another example, as described in connection with FIG. 8, UEs detected in the intersection may be categized based on their travel ways. Thus, the infrastructure 902 may determine that there are four vehicle UEs and a pedestrians based on detecting four UEs on car lanes and a UE on a pedestrian walkway (or on a crosswalk), etc.

In one example, the infrastructure 902, the RSU 904, the vehicle 906, and/or the server may share this information with each other or provide this information to another entity. For example, the server may share this information with another vehicle 912 (or with a mobile/computer application associated with the vehicle 912), such that the vehicle 912 (or the mobile/computer application) has the knowledge that there are two vehicles and a pedestrian at an upcoming intersection. If the vehicle 912 is making a turn on the intersection and observe just two vehicles, the vehicle 912 (or the mobile/computer application) may be configured to be cautious regarding a potential pedestrian that may be at the blind spots/hidden views of the vehicle 912. Similarly, the position, location, and/or UE categorization information may also be very useful for traffic control devices as they may enable the traffic control devices to have a more accurate understanding of the current traffic. For example, when a camera on a traffic light is unable to see all UEs in the area, information related to the number, position, location, and/or types of UEs may be used to predict the traffic instead.

As such, while sensing performed by one entity may just provide a partial information regarding UEs/objects in an area, a combination of sensing data from multiple entities may provide a more complete views and identifications of UEs/objects in the area. In addition, sensing data from sensor(s) or different entities may be curated by a server, and based on the curated sensing data, the server may provide predictive behaviors and/or object classifications for objects/UEs identified (e.g., via machine learning algorithms).

In another aspect of the present disclosure, as shown at 712 of FIG. 7, a mobile device (e.g., a UE 702) may be configured to determine or estimate a measurement of nearby devices (e.g., other UEs 702) and transmit an indication of proximity of nearby devices or an indication whether they likely correspond to a single device (e.g., in the same car or transport vehicle) to a server. In response, the server may cluster the UEs 702 based on the ranging information (e.g., timing or RSSI), and the server may take into account UE locations, such as detected based on their corresponding travel ways as described in connection with FIG. 8 (e.g., on car lanes, bicycle lanes, sidewalk, pedestrian walkway, venue, etc.).

In some scenarios, there may be multiple different UEs associated with the same user (e.g., a user carrying a smartphone and a smartwatch, etc.). As such, in another example, the UEs used by the same user or on the same entity (e.g., the same vehicle) may be configured to provide an indication of which UE(s) is correlated with the user. For example, a first UE (e.g., a smartwatch) may indicate to a server that the second UE (e.g., a smartphone) is associated with the same user or vice versa. As such, if both UEs report their measurements to a server (e.g., measurements associated with the user), the server may drop one of the measurements (e.g., the measurement may be considered as redundant information).

In another aspect of the present disclosure, when different UEs or services of a UE (e.g., different applications on the same UE) are associated with or used by the same user (e.g., a user carrying a smartphone and a smartwatch, or a user installing multiple navigation applications on the same device, etc.), measurements from different UEs/services may be compared to further improve the accuracy of UE categorization and clustering. For example, a UE may obtain measurement data from a first application provider and a second application provider, and the UE (or the user of the UE) may determine a correspondence between the two service or how to offset the measurement data. For example, the UE (or the user of the UE) may notice a first application/UE is more reliable in particular locations or areas (e.g., can be regional specific or area type specific) than a second application/UE. Then, the user may also have a third UE/application that is capable of determining the correspondence between the first UE/application and the second UE/application on top of the data provided by the third UE/application. So the third UE/application may receive data from the second UE/application and determine how well that data corresponds to what it is seeing from UEs in that area and adjust the data accordingly without provide that offset back to the second UE/application. This offset may be more specific to a particular area or provide higher granularity than what the second UE/application provides (e.g., lane specific). The third UE/application may also determine when alerts provided by the second UE/application are relevant or not (e.g., the UE/application or its server may be integrated with a traffic collision real-time database). As such, comparison of measurements from different devices or applications may be used to derive a filter or a prefilter for alerts provided by the third party. Note aspects described herein may also occur at a server, or can occur at a mobile device.

In another example, if the third UE/application is aware of the correspondence between the first UE/application and the second UE/application, the third UE/application may also indicate to a server regarding the potential duplication in the data reported by the first UE/application and the second UE/application, such that the server may be made aware of the "duplicated" UEs. For example, there may be multiple asset trackers in a transportation vehicle. If a network operator is indicating "busy" for an area (e.g., as shown at 506 of FIG. 5), a server or a UE may discount or ignore that indication if the server or the UE is aware that a subset of those asset trackers are all correspond to the same transportation vehicle, so network busy signals may be ignored and not extrapolated to vehicle traffic data for that particular area.

Figure 10:
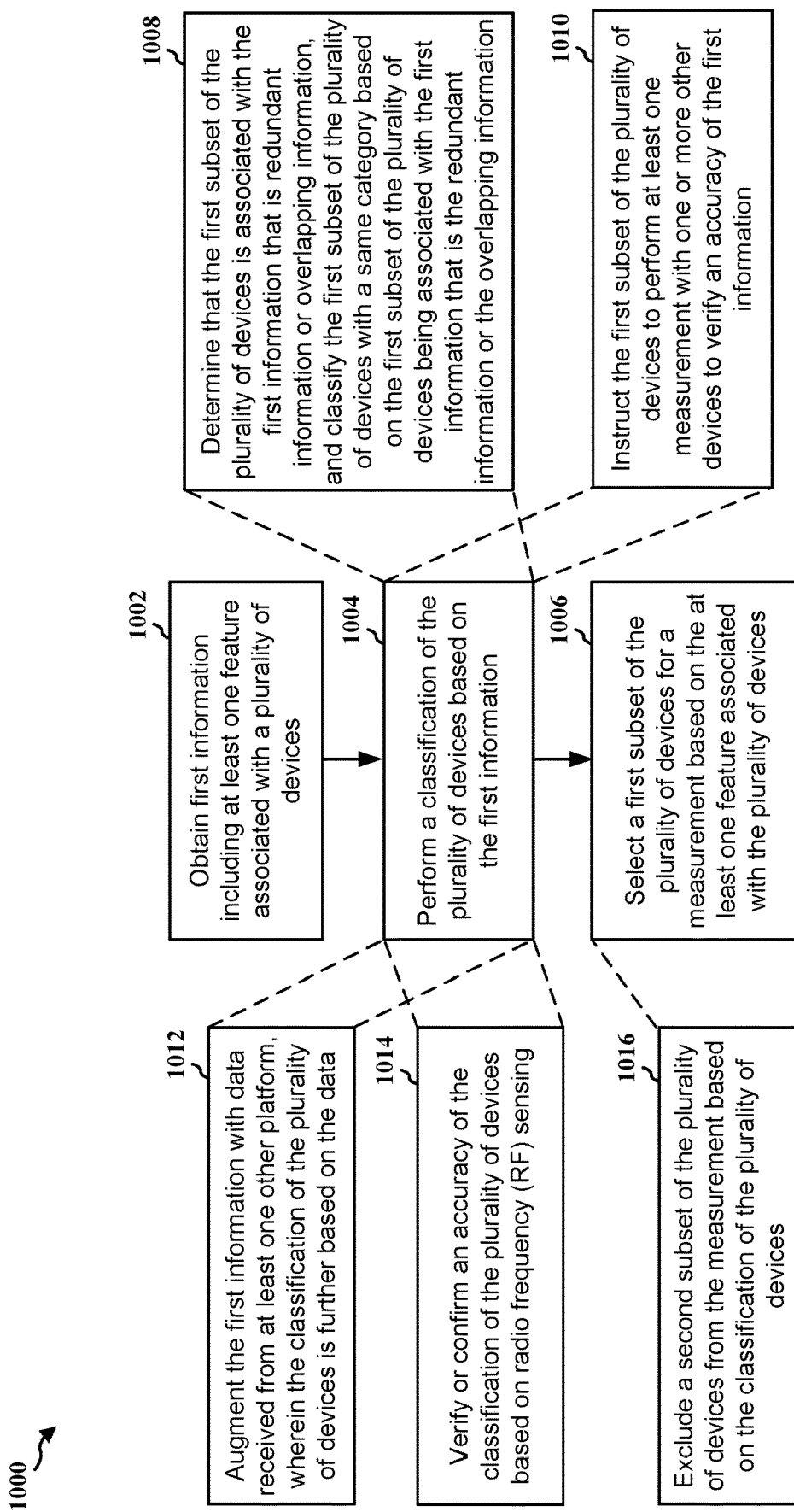
FIG. 10 is a flowchart of a method of wireless communication.

FIG. 10 is a flowchart 1000 of a method of wireless communication. The method may be performed by a network node (e.g., the UE 104, 404, 702; the base station 102; the TRP 402, 406; the infrastructure 602, 902; the vehicle UE 606, 822, 908; the pedestrian UE 604, 818, 910; the cyclist UE 812, the vehicle 906; the apparatus 1204; the network entity 1202). The method may enable the network node to improve the performance and accuracy of mobile/computer applications by differentiating/classifying entities that are associated with UEs and/or entities running the navigations applications, thereby enabling the mobile/computer applications to have a more accurate understanding of the conditions surrounding the UEs and to provide a better navigation for the users.

At 1002, the network node may obtain first information including at least one feature associated with a plurality of devices, such as described in connection with FIG. 6. For example, the infrastructures 602 may obtain information such as the approximate location of a plurality of devices, the number of the plurality of devices, Doppler information associated with the plurality of devices, the orientation of the plurality of devices, and/or the speed of the plurality of devices, etc. The obtaining of the first information may be performed by, e.g., the sensing data process component 198 of the apparatus 1204 in FIG. 12 and/or the sensing data process component 199 of the network entity 1202/1302 in FIGS. 12 and 13.

In one example, the network node may be a UE, a component of the UE, a base station, a component of the base station, a network entity, or a location server.

In another example, the first information may be obtained from the plurality of devices, at least one base station or a component of the at least one base station, at least one RSU, or a combination thereof.

In another example, the at least one feature may correspond to an approximate location of the plurality of devices, a number of the plurality of devices, Doppler information associated with the plurality of devices, an orientation of the plurality of devices, a speed of the plurality of devices, or a combination thereof.

In another example, the at least one feature may correspond to a position of the plurality of devices, and where the position of the plurality of devices is based on V2X positioning, UWB positioning, Wi-Fi positioning, control plane positioning, or a combination thereof.

In another example, the at least one feature may correspond to an acceleration of each of the plurality of devices.

In another example, the at least one feature may correspond to sound captured by the plurality of devices.

In another example, the at least one feature may correspond to an identification of the plurality of devices or one or more objects associated with the plurality of devices. In such an example, the identification of the plurality of devices or the one or more objects associated with the plurality of devices may be based on advanced driver assistance systems.

At 1004, the network node may perform a classification of the plurality of devices based on the first information, such as described in connection with FIG. 6. For example, the infrastructures 602 may determine whether a group of UEs are vehicle UEs 606 or pedestrian UEs 604 based on their speeds and/or locations over a period of time. The classification of the plurality of devices may be performed by, e.g., the sensing data process component 198 of the apparatus 1204 in FIG. 12 and/or the sensing data process component 199 of the network entity 1202/1302 in FIGS. 12 and 13.

In one example, at 1008, to perform the classification of the plurality of devices based on the first information, the network node may identify or determine that the subset of the plurality of devices is associated with the first information that is redundant information or overlapping information, and the network node may classify the first subset of the plurality of devices with a same category based on the first subset of the plurality of devices being associated with the first information that is the redundant information or the overlapping information. In such an example, at 1010, the network node may instruct the first subset of the plurality of devices to perform at least one measurement with one or more other devices to verify an accuracy of the first information.

In another example, at 1012, the network node may augment the first information with data received from at least one other platform, where the classification of the plurality of devices may be further based on the data.

In another example, at 1014, the network node may verify or confirm an accuracy of the classification of the plurality of devices based on RF sensing.

At 1006, the network node may select a first subset of the plurality of devices for a measurement based on the at least one feature associated with the plurality of devices, such as described in connection with FIGS. 6 and 7. For example, as shown by FIG. 7, the infrastructures 602 may differentiate whether a cluster of UEs 702 are associated/co-located with each other based on one or more positioning mechanism, based on the acceleration of UEs 702, and/or based on sounds detected by the UEs 702, etc. Then, the infrastructures 602 may perform measurement for the cluster of UEs (e.g., measurements associated with an application or a server) or refraining from performing measurement for the cluster of UEs, etc. The selection of the first subset of the plurality of devices may be performed by, e.g., the sensing data process component 198 of the apparatus 1204 in FIG. 12 and/or the sensing data process component 199 of the network entity 1202/1302 in FIGS. 12 and 13.

In one example, the application may include a navigation application, a position location application, an advertisement application, or a messaging application.

In another example, at 1016, to select a first subset of the plurality of devices for a measurement, the network node may exclude a second subset of the plurality of devices from the measurement based on the classification of the plurality of devices.

Figure 11:
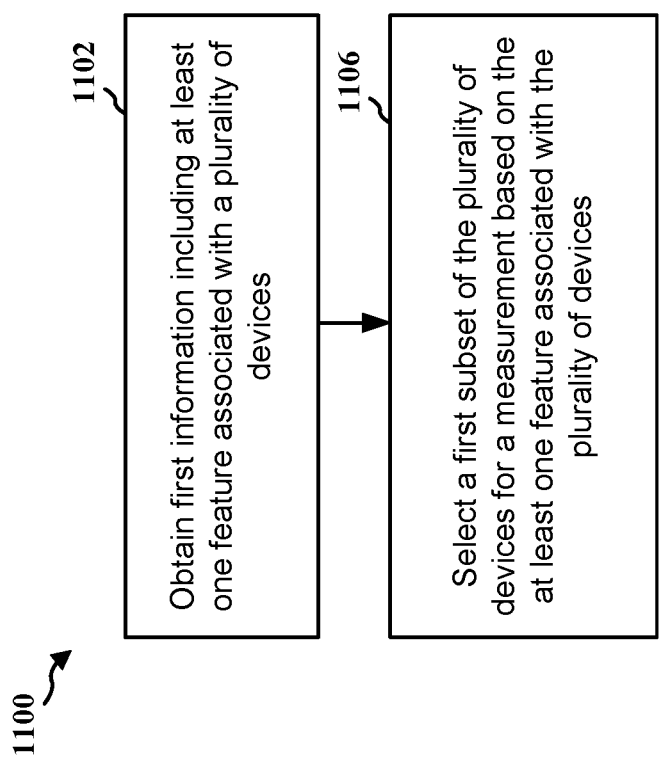
FIG. 11 is a flowchart of a method of wireless communication.

FIG. 11 is a flowchart 1100 of a method of wireless communication. The method may be performed by a network node (e.g., the UE 104, 404, 702; the base station 102; the TRP 402, 406; the infrastructure 602, 902; the vehicle UE 606, 822, 908; the pedestrian UE 604, 818, 910; the cyclist UE 812, the vehicle 906; the apparatus 1204; the network entity 1202). The method may enable the network node to improve the performance and accuracy of mobile/computer applications by differentiating/classifying entities that are associated with UEs and/or entities running the navigations applications, thereby enabling the mobile/computer applications to have a more accurate understanding of the conditions surrounding the UEs and to provide a better navigation for the users.

At 1102, the network node may obtain first information including at least one feature associated with a plurality of devices, such as described in connection with FIG. 6. For example, the infrastructures 602 may obtain information such as the approximate location of a plurality of devices, the number of the plurality of devices, Doppler information associated with the plurality of devices, the orientation of the plurality of devices, and/or the speed of the plurality of devices, etc. The obtaining of the first information may be performed by, e.g., the sensing data process component 198 of the apparatus 1204 in FIG. 12 and/or the sensing data process component 199 of the network entity 1202/1302 in FIGS. 12 and 13.

In one example, the network node may be a UE, a component of the UE, a base station, a component of the base station, a network entity, or a location server.

In another example, the first information may be obtained from the plurality of devices, at least one base station or a component of the at least one base station, at least one RSU, or a combination thereof.

In another example, the at least one feature may correspond to an approximate location of the plurality of devices, a number of the plurality of devices, Doppler information associated with the plurality of devices, an orientation of the plurality of devices, a speed of the plurality of devices, or a combination thereof.

In another example, the at least one feature may correspond to a position of the plurality of devices, and where the position of the plurality of devices is based on V2X positioning, UWB positioning, Wi-Fi positioning, control plane positioning, or a combination thereof.

In another example, the at least one feature may correspond to an acceleration of each of the plurality of devices.

In another example, the at least one feature may correspond to sound captured by the plurality of devices.

In another example, the at least one feature may correspond to an identification of the plurality of devices or one or more objects associated with the plurality of devices. In such an example, the identification of the plurality of devices or the one or more objects associated with the plurality of devices may be based on advanced driver assistance systems.

In another example, the network node may perform a classification of the plurality of devices based on the first information, such as described in connection with FIG. 6. For example, the infrastructures 602 may determine whether a group of UEs are vehicle UEs 606 or pedestrian UEs 604 based on their speeds and/or locations over a period of time. The classification of the plurality of devices may be performed by, e.g., the sensing data process component 198 of the apparatus 1204 in FIG. 12 and/or the sensing data process component 199 of the network entity 1202/1302 in FIGS. 12 and 13.

In another example, to perform the classification of the plurality of devices based on the first information, the network node may identify or determine that the first subset of the plurality of devices is associated with the first information that is redundant information or overlapping information, and the network node may classify the first subset of the plurality of devices with a same category based on the first subset of the plurality of devices being associated with the first information that is the redundant information or the overlapping information. In such an example, the network node may instruct the first subset of the plurality of devices to perform at least one measurement with one or more other devices to verify an accuracy of the first information.

In another example, the network node may augment the first information with data received from at least one other platform, where the classification of the plurality of devices may be further based on the data.

In another example, the network node may verify or confirm an accuracy of the classification of the plurality of devices based on RF sensing.

At 1106, the network node may select a first subset of the plurality of devices for a measurement based on the at least one feature associated with the plurality of devices, such as described in connection with FIGS. 6 and 7. For example, as shown by FIG. 7, the infrastructures 602 may differentiate whether a cluster of UEs 702 are associated/co-located with each other based on one or more positioning mechanism, based on the acceleration of UEs 702, and/or based on sounds detected by the UEs 702, etc. Then, the infrastructures 602 may perform measurement for the cluster of UEs (e.g., measurements associated with an application or a server) or refraining from performing measurement for the cluster of UEs, etc. The selection of the first subset of the plurality of devices may be performed by, e.g., the sensing data process component 198 of the apparatus 1204 in FIG. 12 and/or the sensing data process component 199 of the network entity 1202/1302 in FIGS. 12 and 13.

In one example, the application may include a navigation application, a position location application, an advertisement application, or a messaging application.

In another example, to select a first subset of the plurality of devices for a measurement, the network node may exclude a second subset of the plurality of devices from the measurement based on the classification of the plurality of devices.

Figure 12:
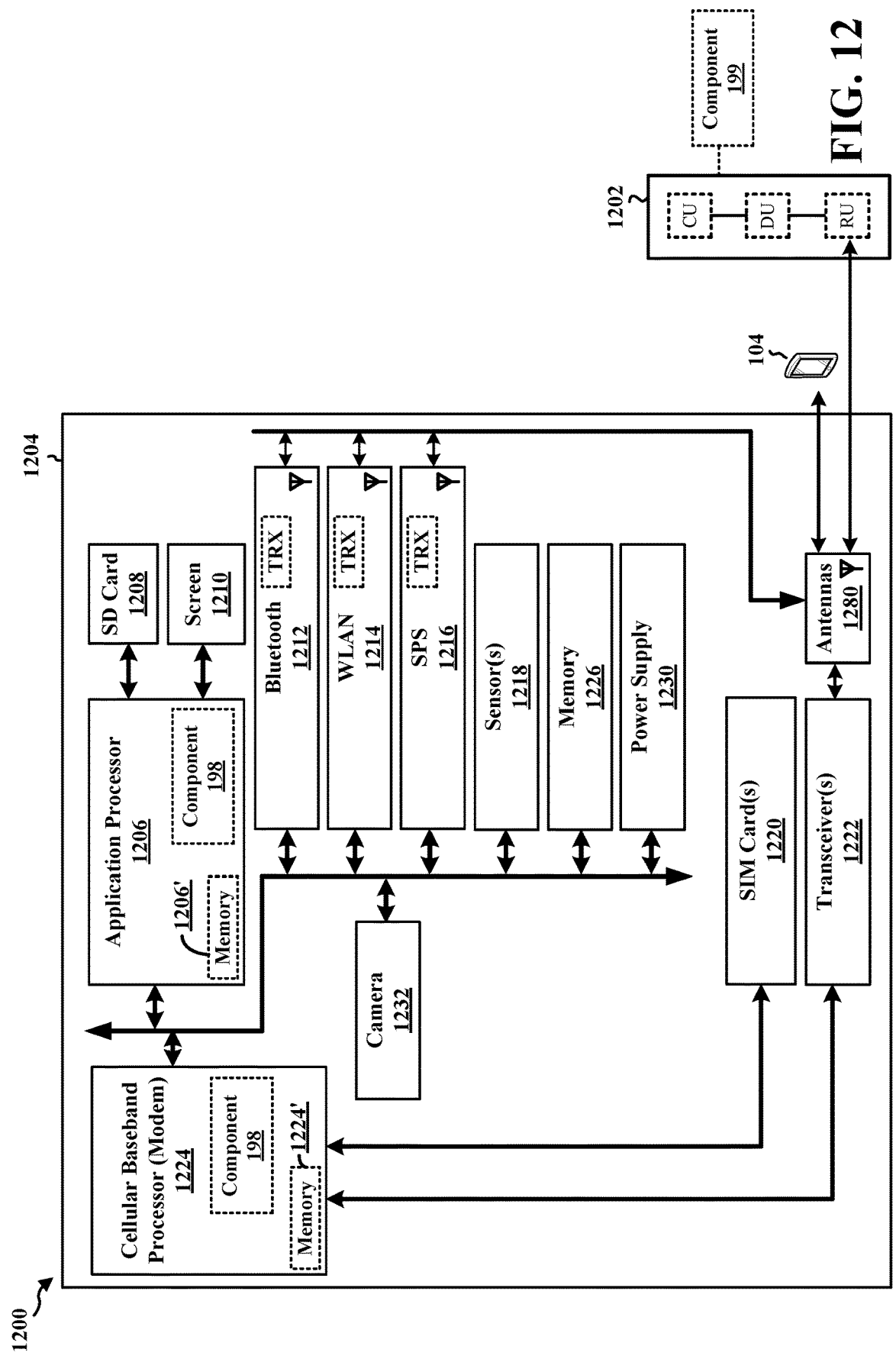
FIG. 12 is a diagram illustrating an example of a hardware implementation for an example apparatus and/or network entity.

FIG. 12 is a diagram 1200 illustrating an example of a hardware implementation for an apparatus 1204. the apparatus 1204 may be a UE, a component of a UE, or may implement UE functionality. In some aspects, the apparatus 1204 may include a cellular baseband processor 1224 (also referred to as a modem) coupled to one or more transceivers 1222 (e.g., cellular RF transceiver). The cellular baseband processor 1224 may include on-chip memory 1224'. In some aspects, the apparatus 1204 may further include one or more subscriber identity modules (SIM) cards 1220 and an application processor 1206 coupled to a secure digital (SD) card 1208 and a screen 1210. The application processor 1206 may include on-chip memory 1206'. In some aspects, the apparatus 1204 may further include a Bluetooth module 1212, a WLAN module 1214, an SPS module 1216 (e.g., GNSS module), one or more sensor modules 1218 (e.g., barometric pressure sensor/altimeter; motion sensor such as inertial management unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1226, a power supply 1230, and/or a camera 1232. The Bluetooth module 1212, the WLAN module 1214, and the SPS module 1216 may include an on-chip transceiver (TRX) (or in some cases, just a receiver (RX)). The Bluetooth module 1212, the WLAN module 1214, and the SPS module 1216 may include their own dedicated antennas and/or utilize the antennas 1280 for communication. The cellular baseband processor 1224 communicates through the transceiver(s) 1222 via one or more antennas 1280 with the UE 104 and/or with an RU associated with a network entity 1202. The cellular baseband processor 1224 and the application processor 1206 may each include a computer-readable medium/memory 1224', 1206', respectively. The additional memory modules 1226 may also be considered a computer-readable medium/memory. Each computer-readable medium/memory 1224', 1206', additional memory modules 1226 may be non-transitory. The cellular baseband processor 1224 and the application processor 1206 are each responsible for general processing, including the execution of software stored on the computer-readable medium/ memory. The software, when executed by the cellular baseband processor 1224/application processor 1206, causes the cellular baseband processor 1224/application processor 1206 to perform the various functions described supra. The computer-readable medium/memory may also be used for storing data that is manipulated by the cellular baseband processor 1224/application processor 1206 when executing software. In some examples, the cellular baseband processor 1224/application processor 1206 may be a component of the UE 350 and may include the memory 360 and/or at least one of the TX processor 368, the RX processor 356, and the controller/processor 359. In other examples, the cellular baseband processor 1224/application processor 1206 may be a component of a base station and may include the TX processor 316, the RX processor 370, and the controller/processor 375. In one configuration, the apparatus 1204 may be a processor chip (modem and/or application) and include just the cellular baseband processor 1224 and/or the application processor 1206, and in another configuration, the apparatus 1204 may be the entire UE (e.g., see 350 of FIG. 3) and include the additional modules of the apparatus 1204.

As discussed supra, the sensing data process component 198 is configured to obtain first information including at least one feature associated with a plurality of devices, and select a first subset of the plurality of devices for a measurement based on the at least one feature associated with the plurality of devices. The sensing data process component 198 may be within the cellular baseband processor 1224, the application processor 1206, or both the cellular baseband processor 1224 and the application processor 1206. The sensing data process component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 1204 may include a variety of components configured for various functions. In one configuration, the apparatus 1204, and in particular the cellular baseband processor 1224 and/or the application processor 1206, includes means for obtaining first information including at least one feature associated with a plurality of devices; means for performing a classification of the plurality of devices based on the first information; means for selecting a first subset of the plurality of devices for a measurement based on the at least one feature associated with the plurality of devices; means for identifying or determining that the first subset of the plurality of devices is associated with the first information that is redundant information or overlapping information; means for classifying the first subset of the plurality of devices with a same category based on the first subset of the plurality of devices being associated with the first information that is the redundant information or the overlapping information; means for instructing the first subset of the plurality of devices to perform at least one measurement with one or more other devices to verify an accuracy of the first information; means for augmenting the first information with data received from at least one other platform, where the classification of the plurality of devices is further based on the data; means for verifying or confirming an accuracy of the classification of the plurality of devices based on RF sensing; and/or means for excluding the first subset of the plurality of devices from the application or the measurement based on the classification of the plurality of devices. The means may be the sensing data process component 198 of the apparatus 1204 or configured to perform the functions recited by the means. As described supra, the apparatus 1204 may include the TX processor 368, the RX processor 356, and the controller/processor 359. As such, in one configuration, the means may be the TX processor 368, the RX processor 356, and/or the controller/processor 359 configured to perform the functions recited by the means.

Figure 13:
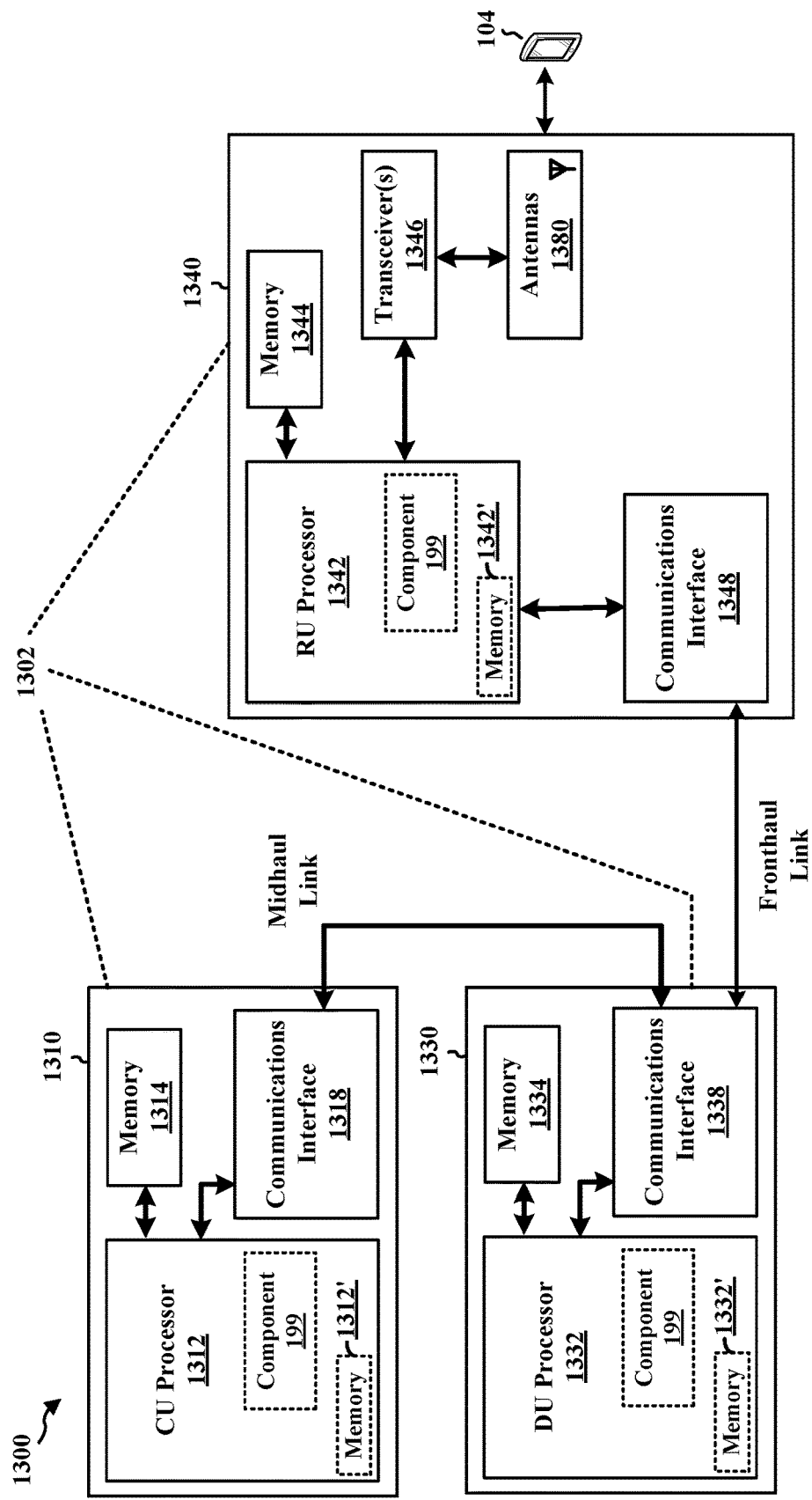
FIG. 13 is a diagram illustrating an example of a hardware implementation for an example apparatus and/or network entity.

FIG. 13 is a diagram 1300 illustrating an example of a hardware implementation for a network entity 1302. The network entity 1302 may be a BS, a component of a BS, or may implement BS functionality. The network entity 1302 may include at least one of a CU 1310, a DU 1330, or an RU 1340. For example, depending on the layer functionality handled by the component 199, the network entity 1302 may include the CU 1310; both the CU 1310 and the DU 1330; each of the CU 1310, the DU 1330, and the RU 1340; the DU 1330; both the DU 1330 and the RU 1340; or the RU 1340. The CU 1310 may include a CU processor 1312. The CU processor 1312 may include on-chip memory 1312'. In some aspects, the CU 1310 may further include additional memory modules 1314 and a communications interface 1318. The CU 1310 communicates with the DU 1330 through a midhaul link, such as an F1 interface. The DU 1330 may include a DU processor 1332. The DU processor 1332 may include on-chip memory 1332'. In some aspects, the DU 1330 may further include additional memory modules 1334 and a communications interface 1338. The DU 1330 communicates with the RU 1340 through a fronthaul link. The RU 1340 may include an RU processor 1342. The RU processor 1342 may include on-chip memory 1342'. In some aspects, the RU 1340 may further include additional memory modules 1344, one or more transceivers 1346, antennas 1380, and a communications interface 1348. The RU 1340 communicates with the UE 104. The on-chip memory 1312', 1332', 1342' and the additional memory modules 1314, 1334, 1344 may each be considered a computer-readable medium/memory. Each computer-readable medium/memory may be non-transitory. Each of the processors 1312, 1332, 1342 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the component 199 is configured to obtain first information including at least one feature associated with a plurality of devices, and select a first subset of the plurality of devices for a measurement based on the at least one feature associated with the plurality of devices. The component 199 may be within one or more processors of one or more of the CU 1310, DU 1330, and the RU 1340. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1302 may include a variety of components configured for various functions. In one configuration, the network entity 1302 includes means for obtaining first information including at least one feature associated with a plurality of devices; means for performing a classification of the plurality of devices based on the first information; means for selecting a first subset of the plurality of devices for a measurement based on the at least one feature associated with the plurality of devices; means for identifying or determining that the first subset of the plurality of devices is associated with the first information that is redundant information or overlapping information; means for classifying the first subset of the plurality of devices with a same category based on the first subset of the plurality of devices being associated with the first information that is the redundant information or the overlapping information; means for instructing the first subset of the plurality of devices to perform at least one measurement with one or more other devices to verify an accuracy of the first information; means for augmenting the first information with data received from at least one other platform, where the classification of the plurality of devices is further based on the data; means for verifying or confirming an accuracy of the classification of the plurality of devices based on RF sensing; and/or means for excluding the first subset of the plurality of devices from the application or the measurement based on the classification of the plurality of devices. The means may be the component 199 of the network entity 1302 configured to perform the functions recited by the means. As described supra, the network entity 1302 may include the TX processor 316, the RX processor 370, and the controller/processor 375. As such, in one configuration, the means may be the TX processor 316, the RX processor 370, and/or the controller/processor 375 configured to perform the functions recited by the means.

Figure 14:
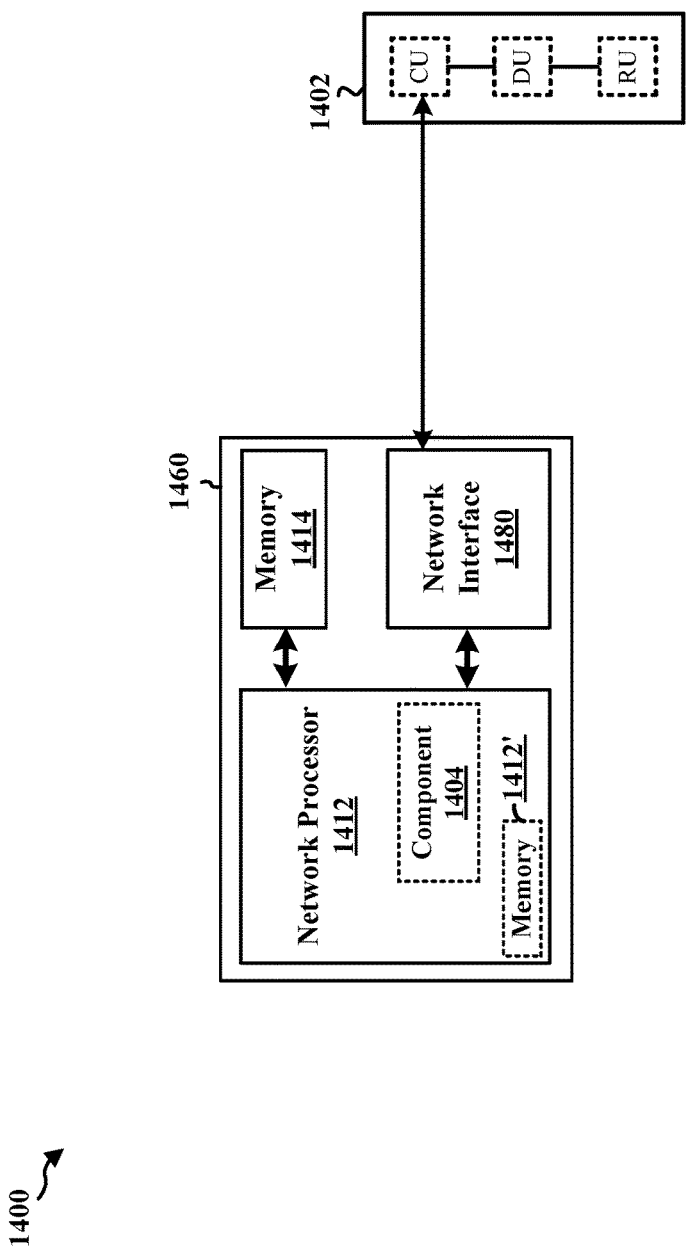
FIG. 14 is a diagram illustrating an example of a hardware implementation for an example apparatus and/or network entity.

FIG. 14 is a diagram 1400 illustrating an example of a hardware implementation for a network entity 1460. In one example, the network entity 1460 may be within the core network 120. The network entity 1460 may include a network processor 1412. The network processor 1412 may include on-chip memory 1412'. In some aspects, the network entity 1460 may further include additional memory modules 1414. The network entity 1460 communicates via the network interface 1480 directly (e.g., backhaul link) or indirectly (e.g., through a RIC) with the CU 1402. The on-chip memory 1412' and the additional memory modules 1414 may each be considered a computer-readable medium/memory. Each computer-readable medium/memory may be non-transitory. The processor 1412 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the component 1404 is configured to obtain first information including at least one feature associated with a plurality of devices, and select a first subset of the plurality of devices for a measurement based on the at least one feature associated with the plurality of devices. The component 1404 may be within the processor 1412. The component 1404 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1460 may include a variety of components configured for various functions. In one configuration, the network entity 1460 includes means for obtaining first information including at least one feature associated with a plurality of devices; means for performing a classification of the plurality of devices based on the first information; means for selecting a first subset of the plurality of devices for a measurement based on the at least one feature associated with the plurality of devices; means for identifying or determining that the first subset of the plurality of devices is associated with the first information that is redundant information or overlapping information; means for classifying the first subset of the plurality of devices with a same category based on the first subset of the plurality of devices being associated with the first information that is the redundant information or the overlapping information; means for instructing the first subset of the plurality of devices to perform at least one measurement with one or more other devices to verify an accuracy of the first information; means for augmenting the first information with data received from at least one other platform, where the classification of the plurality of devices is further based on the data; means for verifying or confirming an accuracy of the classification of the plurality of devices based on RF sensing; and/or means for excluding the first subset of the plurality of devices from the application or the measurement based on the classification of the plurality of devices. The means may be the component 1404 of the network entity 1460 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is an apparatus for wireless communication at a network node, including: a memory; and at least one processor coupled to the memory and, based at least in part on information stored in the memory, the at least one processor is configured to: obtain first information including at least one feature associated with a plurality of devices; and select a first subset of the plurality of devices for a measurement based on the at least one feature associated with the plurality of devices.

Aspect 2 is the apparatus of aspect 1, where the network node is a UE, a component of the UE, a base station, a component of the base station, a network entity, or a location server.

Aspect 3 is the apparatus of any of aspects 1 and 2, where the first information is obtained from the plurality of devices, at least one base station or a component of the at least one base station, at least one RSU, or a combination thereof.

Aspect 4 is the apparatus of any of aspects 1 to 3, where the measurement is associated with at least one of: a navigation application, a position location application, an advertisement application, a messaging application, a location server, a crowd-sourcing server, or a venue statistic calculation.

Aspect 5 is the apparatus of any of aspects 1 to 4, where the at least one feature corresponds to an approximate location of the plurality of devices, a relative location of the plurality of devices, a location of the plurality of devices on corresponding travel ways, a number of the plurality of devices, Doppler information associated with the plurality of devices, an orientation of the plurality of devices, a speed of the plurality of devices, or a combination thereof.

Aspect 6 is the apparatus of any of aspects 1 to 5, where the at least one feature corresponds to a position of the plurality of devices, and where the position of the plurality of devices is based on V2X positioning, UWB positioning, Wi-Fi positioning, control plane positioning, or a combination thereof.

Aspect 7 is the apparatus of any of aspects 1 to 6, where the at least one feature corresponds to an acceleration of each of the plurality of devices.

Aspect 8 is the apparatus of any of aspects 1 to 7, where the at least one feature corresponds to sound captured by the plurality of devices.

Aspect 9 is the apparatus of any of aspects 1 to 8, where the at least one processor is further configured to: perform a classification of the plurality of devices based on the first information.

Aspect 10 is the apparatus of aspect 9, where to perform the classification of the plurality of devices based on the first information, the at least one processor is further configured to: identify or determine that the first subset of the plurality of devices is associated with the first information that is redundant information or overlapping information; and classify the first subset of the plurality of devices with a same category based on the first subset of the plurality of devices being associated with the first information that is the redundant information or the overlapping information.

Aspect 11 is the apparatus of aspect 10, where the at least one processor is further configured to: instruct the first subset of the plurality of devices to perform at least one measurement with one or more other devices to verify an accuracy of the first information.

Aspect 12 is the apparatus of aspect 9, where the at least one processor is further configured to: augment the first information with data received from at least one other platform, where the classification of the plurality of devices is further based on the data.

Aspect 13 is the apparatus of aspect 9, where the at least one processor is further configured to: verify or confirm an accuracy of the classification of the plurality of devices based on RF sensing.

Aspect 14 is the apparatus of aspect 9, where to select the first subset of the plurality of devices for the measurement, the at least one processor is configured to: exclude a second subset of the plurality of devices from the measurement based on the classification of the plurality of devices.

Aspect 15 is the apparatus of any of aspects 1 to 14, where the at least one feature corresponds to an identification of the plurality of devices or one or more objects associated with the plurality of devices.

Aspect 16 is the apparatus of aspect 15, where the identification of the plurality of devices or the one or more objects associated with the plurality of devices is based on advanced driver assistance systems.

Aspect 17 is the apparatus of any of aspects 1 to 16, further including at least one of a transceiver or an antenna coupled to the at least one processor.

Aspect 18 is a method of wireless communication for implementing any of aspects 1 to 17.

Aspect 19 is an apparatus for wireless communication including means for implementing any of aspects 1 to 17.

Aspect 20 is a computer-readable medium storing computer executable code, where the code when executed by a processor causes the processor to implement any of aspects 1 to 17.

What is claimed is:

1. An apparatus for wireless communication at a network node, comprising:
at least one memory; and
at least one processor coupled to the at least one memory and, based at least in part on information stored in the at least one memory, the at least one processor is configured to:
obtain first information including at least one feature associated with a plurality of devices;
classify, based on the first information, a first subset of devices in the plurality of devices as a cluster of user equipments (UEs) collocated with each other; and
perform a traffic prediction based on treating the cluster of UEs as one UE.

2. The apparatus of claim 1, wherein the network node is a user equipment (UE), a component of the UE, a base station, a component of the base station, a network entity, or a location server.

3. The apparatus of claim 1, wherein to obtain the first information, the at least one processor is configured to obtain the first information from the plurality of devices, at least one base station or a component of the at least one base station, at least one road side unit RSU), or a combination thereof.

4. The apparatus of claim 1, wherein the traffic prediction is associated with at least one of: a navigation application, a position location application, an advertisement application, a messaging application, a location server, a crowdsourcing server, or a venue statistic calculation.

5. The apparatus of claim 1, wherein the at least one feature corresponds to an approximate location of the plurality of devices, a relative location of the plurality of devices, a location of the plurality of devices on corresponding travel ways, a number of the plurality of devices, Doppler information associated with the plurality of devices, an orientation of the plurality of devices, a speed of the plurality of devices, or a combination thereof.

6. The apparatus of claim 1, wherein the at least one feature corresponds to a position of the plurality of devices, and wherein the position of the plurality of devices is based on vehicle-to-everything (V2X) positioning, ultra-wideband (UWB) positioning, Wi-Fi positioning, control plane positioning, or a combination thereof.

7. The apparatus of claim 1, wherein the at least one feature corresponds to an acceleration of each of the plurality of devices.

8. The apparatus of claim 1, wherein the at least one feature corresponds to sound captured by the plurality of devices.

9. The apparatus of claim 1, wherein to classify, based on the first information, the first subset of devices in the plurality of devices as the cluster of UEs collocated with each other, the at least one processor is configured to:
receive sounds recorded by the first subset of devices in the plurality of devices; and
classify the first subset of devices in the plurality of devices as the cluster of UEs collocated with each other based on the sounds recorded by the first subset of devices being similar.

10. The apparatus of claim 9, wherein the sounds include hum of tires, engine noise, air turbulence, passengers talking, music, or a combination thereof.

11. The apparatus of claim 1, wherein the at least one processor is further configured to:
instruct the first subset of devices to perform at least one measurement with one or more other devices to verify an accuracy of the first information.

12. The apparatus of claim 1, wherein the at least one processor is further configured to:

augment the first information with data received from at least one other platform, wherein classification of the first subset of devices in the plurality of devices as the cluster of UEs collocated with each other is further based on the data.

13. The apparatus of claim 1, wherein the at least one processor is further configured to:
verify or confirm an accuracy of classification of the first subset of devices in the plurality of devices as the cluster of UEs collocated with each other based on radio frequency (RF) sensing.

14. The apparatus of claim 1, wherein to classify, based on the first information, the first subset of devices in the plurality of devices as the cluster of UEs collocated with each other, the at least one processor is configured to:
exclude, based on the first information, a second subset of devices in the plurality of devices that is classified as a pedestrian UE, wherein the pedestrian UE correspond to a UE being held by, or co-located with, a pedestrian.

15. The apparatus of claim 1, wherein the at least one feature corresponds to an identification of the plurality of devices or one or more objects associated with the plurality of devices.

16. The apparatus of claim 15, wherein the identification of the plurality of devices or the one or more objects associated with the plurality of devices is based on using at least one sensor associated with an advanced driver assistance systems (ADAS).

17. A method of wireless communication at a network node, comprising:
obtaining first information including at least one feature associated with a plurality of devices;
classifying, based on the first information, a first subset of devices in the plurality of devices as a cluster of user equipments (UEs) collocated with each other; and
performing a traffic prediction based on treating the cluster of UEs as one UE.

18. The method of claim 17, wherein obtaining the first information comprises obtaining the first information from the plurality of devices, at least one base station or a component of the at least one base station, at least one road side unit (RSU), or a combination thereof.

19. The method of claim 17, wherein the at least one feature corresponds to an approximate location of the plurality of devices, a relative location of the plurality of devices, a location of the plurality of devices on corresponding travel ways, a number of the plurality of devices, Doppler information associated with the plurality of devices, an orientation of the plurality of devices, a speed of the plurality of devices, or a combination thereof.

20. The method of claim 17, wherein the at least one feature corresponds to a position of the plurality of devices, and wherein the position of the plurality of devices is based on vehicle-to-everything (V2X) positioning, ultra-wideband (UWB) positioning, Wi-Fi positioning, control plane positioning, or a combination thereof.

21. The method of claim 17, wherein the at least one feature corresponds to an acceleration of each of the plurality of devices or to sound captured by the plurality of devices.

22. The method of claim 17, wherein classifying, based on the first information, the first subset of devices in the plurality of devices as the cluster of UEs collocated with each other comprises:
receiving sounds recorded by the first subset of devices in the plurality of devices; and
classifying the first subset of devices in the plurality of devices as the cluster of UEs collocated with each other based on the sounds recorded by the first subset of devices being similar.

23. The method of claim 22, the sounds include hum of tires, engine noise, air turbulence, passengers talking, music, or a combination thereof.

24. The method of claim 17, further comprising:
instructing the first subset of devices to perform at least one measurement with one or more other devices to verify an accuracy of the first information.

25. The method of claim 22, further comprising:
augmenting the first information with data received from at least one other platform, wherein classification of the first subset of devices in the plurality of devices as the cluster of UEs collocated with each other is further based on the data.

26. The method of claim 22, further comprising:
verifying or confirming an accuracy of classification of the first subset of devices in the plurality of devices as the cluster of UEs collocated with each other based on radio frequency (RF) sensing.

27. The method of claim 22, wherein classifying, based on the first information, the first subset of devices in the plurality of devices as the cluster of UEs collocated with each other comprises:
excluding, based on the first information, a second subset of devices in the plurality of devices that is classified as a pedestrian UE, wherein the pedestrian UE correspond to a UE being held by, or co-located with, a pedestrian.

28. The method of claim 17, wherein the at least one feature corresponds to an identification of the plurality of devices or one or more objects associated with the plurality of devices based on using at least one sensor.

29. An apparatus for wireless communication at a network node, comprising:
means for obtaining first information including at least one feature associated with a plurality of devices;
means for classifying, based on the first information, a first subset of devices in the plurality of devices as a cluster of user equipments (UEs) collocated with each other; and
means for performing a traffic prediction based on treating the cluster of UEs as one UE.

30. A non-transitory computer-readable medium storing computer executable code at a network node, the code when executed by a processor causes the processor to:
obtain first information including at least one feature associated with a plurality of devices;
classify, based on the first information, a first subset of devices in the plurality of devices as a cluster of user equipments (UEs) collocated with each other; and
perform a traffic prediction based on treating the cluster of UEs as one UE.

* * * * *